United States Patent
Zheng et al.

(10) Patent No.: US 9,501,429 B2
(45) Date of Patent: Nov. 22, 2016

(54) DYNAMIC KEY AND RULE STORAGE PROTECTION

(71) Applicant: ViXS Systems Inc., Toronto (CA)

(72) Inventors: Heyun Zheng, Toronto (CA); Norman Stewart, Toronto (CA); Jing Zhang, Richmond Hill (CA)

(73) Assignee: VIXS Systems Inc., Toronto (CA)

( * ) Notice: Subject to any disclaimer, the term of this patent is extended or adjusted under 35 U.S.C. 154(b) by 0 days.

(21) Appl. No.: 14/614,806

(22) Filed: Feb. 5, 2015

(65) Prior Publication Data

US 2016/0315765 A1 Oct. 27, 2016

Related U.S. Application Data

(63) Continuation-in-part of application No. 14/048,391, filed on Oct. 8, 2013, now Pat. No. 9,317,449, which is a continuation-in-part of application No. 12/651,996, filed on Jan. 4, 2010, now Pat. No. 8,594,333, which is a continuation-in-part of application No. 12/490,777, filed on Jun. 24, 2009, now Pat. No. 8,781,127.

(60) Provisional application No. 61/094,541, filed on Sep. 5, 2008.

(51) Int. Cl.
*G06F 12/14* (2006.01)
*H04L 9/08* (2006.01)
*G06F 21/72* (2013.01)
*G06F 21/79* (2013.01)
(Continued)

(52) U.S. Cl.
CPC ......... *G06F 12/1408* (2013.01); *G06F 21/602* (2013.01); *G06F 21/6209* (2013.01); *G06F 21/72* (2013.01); *G06F 21/79* (2013.01); *H04L 9/088* (2013.01); *H04L 9/0822* (2013.01); *H04L 9/3247* (2013.01); *H04N 7/1675* (2013.01); *H04N 21/4181* (2013.01); *H04N 21/4183* (2013.01); *H04N 21/42623* (2013.01); *H04N 21/42692* (2013.01); *H04N 21/4431* (2013.01); *H04N 21/4435* (2013.01); *G06F 2221/2127* (2013.01); *H04L 9/0894* (2013.01); *H04L 2209/12* (2013.01); *H04L 2209/60* (2013.01)

(58) Field of Classification Search
CPC . G06F 21/64; G06F 21/71; G06F 2221/2107
See application file for complete search history.

(56) References Cited

U.S. PATENT DOCUMENTS 6,035,326 A * 3/2000 Miles ................ H04L 29/12009
709/206
6,091,820 A * 7/2000 Aziz ..................... H04L 9/0841
380/30

(Continued)

OTHER PUBLICATIONS

Non-Final Office Action mailed Sep. 30, 2015 for U.S. Appl. No. 14/614,797, 23 pages.

(Continued)

*Primary Examiner* — James Turchen

(57) ABSTRACT

A media processing device includes a key store memory to store a plurality of cryptographic keys and a rule set memory to store a plurality of rules for the plurality of cryptographic keys. The media processing device further includes an integrity module to determine a first cyclical redundancy check (CRC) value from the plurality of rules stored in the rule set memory and compare the first CRC with a second CRC value associated with the plurality of rules. The media processing device further includes an arbitration module to prevent further access to the plurality of rules in the rule set memory responsive to the integrity verification module signaling a mismatch between the first CRC and the second CRC.

16 Claims, 20 Drawing Sheets

(51) Int. Cl.
  *H04L 9/32* (2006.01)
  *H04N 7/167* (2011.01)
  *H04N 21/418* (2011.01)
  *H04N 21/426* (2011.01)
  *H04N 21/443* (2011.01)
  *G06F 21/60* (2013.01)
  *G06F 21/62* (2013.01)

(56) References Cited

U.S. PATENT DOCUMENTS

| | | | | |
|---|---|---|---|---|
| 6,708,231 | B1* | 3/2004 | Kitagawa | G06F 8/65 710/10 |
| 6,802,006 | B1* | 10/2004 | Bodrov | G06F 21/64 713/164 |
| 7,010,740 | B1* | 3/2006 | Walton | G06F 11/2005 714/763 |
| 7,096,355 | B1* | 8/2006 | Marvit | H04L 63/0428 380/264 |
| 7,346,169 | B2* | 3/2008 | Asano | G06F 21/10 380/277 |
| 7,953,907 | B1* | 5/2011 | Nguyen | G06F 11/0793 370/216 |
| 7,979,464 | B2* | 7/2011 | Seidel | G06F 17/30038 707/781 |
| 8,843,412 | B2* | 9/2014 | Paliwal | 705/50 |
| 2002/0099950 | A1* | 7/2002 | Smith | G06F 12/1466 726/26 |
| 2003/0018398 | A1* | 1/2003 | Juntunen | G05B 19/042 700/24 |
| 2003/0233347 | A1* | 12/2003 | Weinberg | G06F 17/30312 |
| 2004/0039718 | A1* | 2/2004 | Lumpp | G06N 5/022 706/47 |
| 2004/0088558 | A1* | 5/2004 | Candelore | H04N 7/1675 713/193 |
| 2004/0133632 | A1* | 7/2004 | Messerges | G06F 21/10 709/203 |
| 2005/0172132 | A1* | 8/2005 | Chen | H04L 9/0822 713/180 |
| 2005/0177741 | A1* | 8/2005 | Chen | H04L 9/0822 713/189 |
| 2006/0095379 | A1* | 5/2006 | Kim | G06F 21/602 705/51 |
| 2006/0133377 | A1* | 6/2006 | Jain | H04L 63/1408 370/392 |
| 2006/0184796 | A1* | 8/2006 | Fahrny | H04N 21/4623 713/176 |
| 2006/0265733 | A1* | 11/2006 | Chen | G06F 21/71 726/1 |
| 2006/0294299 | A1* | 12/2006 | Edirisooriya | G06F 11/1008 711/112 |
| 2007/0201458 | A1* | 8/2007 | Thron | H04L 47/10 370/389 |
| 2007/0239605 | A1* | 10/2007 | Munguia | G06F 21/602 705/50 |
| 2007/0266421 | A1* | 11/2007 | Vaidya | H04L 63/20 726/1 |
| 2008/0057947 | A1* | 3/2008 | Marolia | H04L 67/34 455/425 |
| 2008/0130895 | A1* | 6/2008 | Jueneman | H04L 9/3066 380/277 |
| 2008/0270311 | A1* | 10/2008 | Peterka | G06F 21/10 705/59 |
| 2008/0294906 | A1* | 11/2008 | Chang | H04L 9/3263 713/182 |
| 2009/0055656 | A1* | 2/2009 | Mersh | G06F 21/79 713/187 |
| 2009/0060174 | A1* | 3/2009 | Marino | H04L 9/3239 380/28 |
| 2009/0282261 | A1* | 11/2009 | Khan | G06F 21/72 713/189 |
| 2010/0061555 | A1 | 3/2010 | Ducharme et al. | |
| 2010/0189262 | A1 | 7/2010 | Ducharme et al. | |
| 2014/0136855 | A1 | 5/2014 | Ducharme et al. | |

OTHER PUBLICATIONS

Provisional U.S. Appl. No. 61/094,541, filed Sep. 5, 2008, entitled "Secure Methods for System on a Chip Cryptographic Key Access and Storage".

U.S. Appl. No. 14/614,797, filed Feb. 5, 2015, entitled "Provisioning of Secure Storage for Both Static and Dynamic Rules for Cryptographic Key Information".

* cited by examiner

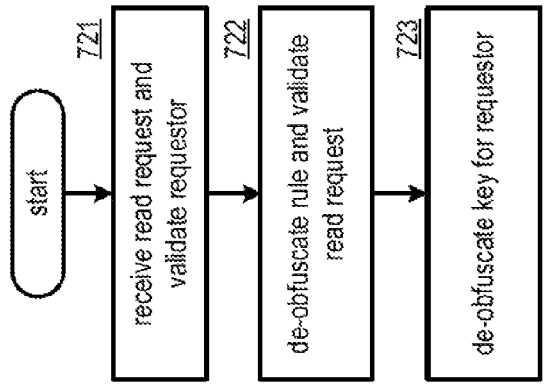
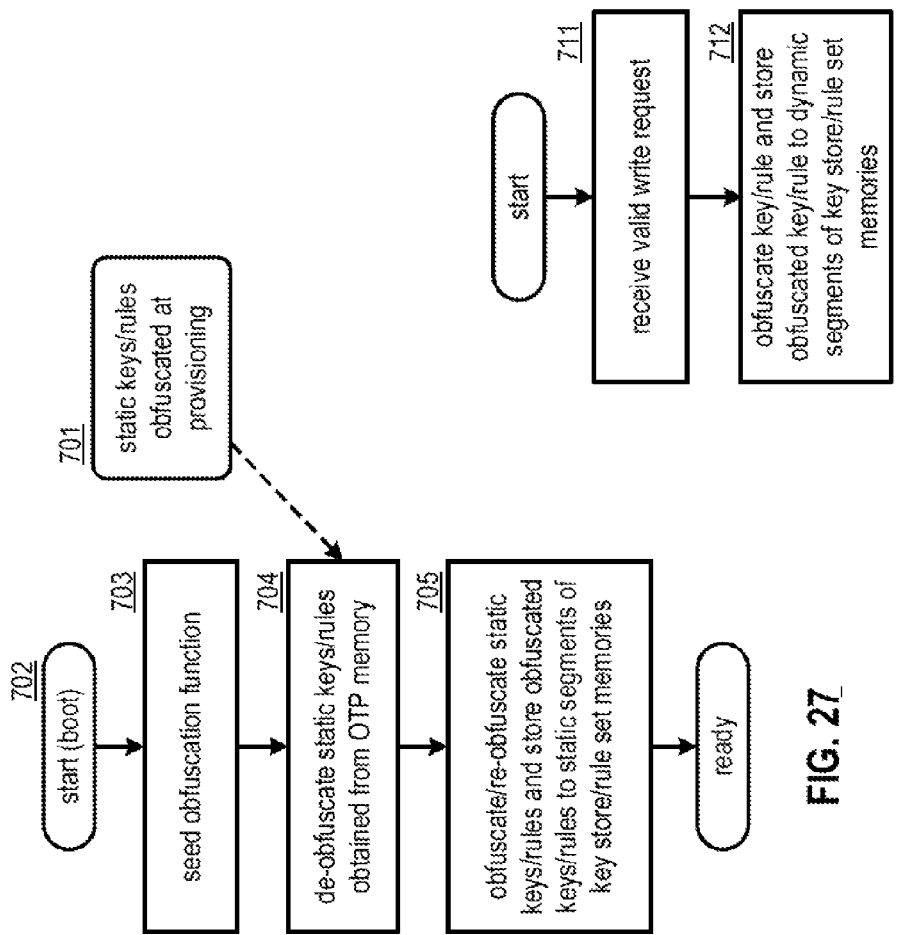

DYNAMIC KEY AND RULE STORAGE PROTECTION

CROSS-REFERENCE TO RELATED APPLICATIONS

The present application claims priority as a continuation-in-part application to U.S. patent application Ser. No. 14/048,391, filed on May 15, 2014 and entitled "Secure key access with one-time programmable memory and applications thereof", which claims priority as a continuation-in-part application to U.S. patent application Ser. No. 12/651,996, filed on Jan. 4, 2010 and entitled "Secure Key Access With One-Time Programmable Memory and Applications Thereof", which in turn claims priority as a continuation-in-part application to U.S. patent application Ser. No. 12/490,777, filed Jun. 24, 2009 and entitled "Device With Privileged Memory and Applications Thereof," which claims priority to U.S. Patent Application Ser. No. 61/094,541, filed Sep. 5, 2008 and entitled "Methods for System on a Chip Cryptographic Key Access and Storage", the entireties of which are incorporated by reference herein.

The present application is related to co-pending U.S. patent application Ser. No. 14/614,797, entitled "Provisioning of Secure Storage for Both Static and Dynamic Rules of Cryptographic Key Information" and filed on even date herewith, the entirety of which is incorporated by reference herein.

BACKGROUND

1. Field of the Disclosure

The present disclosure relates generally to techniques for securing data and, more particularly, techniques for storing and providing access to cryptographic keys and other secret values used to secure data.

2. Description of the Related Art

The desire to keep media content or other proprietary information secure from unauthorized use (e.g., unauthorized copying, distribution, etc.) is driven by a sector of the population that places little to no value on the intellectual properties rights of others. As such, the battle between creating security systems for digital information and the hackers that attempt to break them continues.

This battle is intensifying with the integration of electronic device features being implemented on a single device (e.g., computer with DVD functionality) and is further intensified by video processing hardware being implemented as stand-alone system on a chip (SOC) devices. In many instances, the video processing hardware SOC uses an operating system that allows end users to write their own applications, which means that the user's application may share the same processors and memory space as the security system. This makes the security operations vulnerable. To reduce the vulnerability, media processing hardware needs to be constrained to performing only specific intended types of cryptographic operations.

In addition, media processing devices, which include the media processing hardware SOC, are embedded with licensed secret keys for compliance with one or more of a plurality of media application standards (e.g., BD, DTCP, CPRM, Cable Card, etc.). Typically, such a media application standard includes a revocation mechanism whereby, if a secret key value is made public, the security functions of the compromised devices are revoked and the devices are rendered inoperable. As such, it is highly desirable that the secret keys are stored in such a way that they are not accessible to the firmware of the device (in order to avoid revocation). This is typically done by storing the secret keys in a one-time programmable (OTP) memory.

While using OTP memory has become a primary mechanism for storing secret keys within media processing devices, it is not a failsafe approach. For example, a security issue arises when multiple cryptographic clients (e.g., a hardware block that performs a specific cryptographic algorithm such as RSA, TSD, ECC, DMA, etc.) may issue read or write requests to the OTP memory asynchronously and that the requests are not atomic. In addition, as a result of granularity associated with OTP memory large key values are partitioned into smaller blocks, which have special read/write rules that are imposed on every block. Thus, it becomes necessary to associate a macro level restriction on cryptographic clients down to every micro level block access performed by the client.

As a specific example, the RSA algorithm can perform a 2048 bit RSA operation, which requires 32 reads of 64 bit blocks from the key store to assemble the exponent. If a key is intended to be used as a 2048 bit exponent, then every 64 bit block read must be associated with the intended purpose of the key; i.e. blocks have to have an attribute indicating which cryptographic client is permitted to access a particular block associated with a larger key.

Another security problem is that cryptographic strength often relies on using large keys (e.g., up to 2048 bits for RSA or 256 bits for some AES modes). However, if the large key is used one 64 bit block at a time by a weaker cryptographic client, then large keys may be attacked 64 bits (or less) at a time. Yet another way to attack large keys is to decimate a large key by overwriting portions of the key with 0's, and then perform the intended operations, but with the remainder of the weakened key. Every time a portion of the key is decimated in this way, the remainder can be determined because portions of the key are now known.

Still further, some cryptographic clients have the ability to perform operations at various levels of strength; for example, the RSA algorithm can be configured for variable size modulus or 3DES can be degraded into a DES operation. This can be exploited by a hacker to perform weaker operations and thereby attack large keys with degraded operations. Even further, some cryptographic clients use control words (CWs) and initial vectors (IVs) within the security operations. The integrity of a security system may be attacked by using an unknown CW as an IV in an operation where the clear text and the CW are known, which could be used to reveal the unknown CW value.

Another important aspect of maintaining the integrity of cryptographic operations is controlling the destination of the cryptographic operation results. For example, content exported from the SOC poses a far greater risk than content which is retained within the SOC. Yet another mode of attack involves using a key, a CW or an IV to decrypt content instead of encrypting the content. For example the intention may be to encrypt content however a hacker may use a key store value to decrypt the content.

In addition to the threat of hackers, the security of the secure content information is at risk from unauthorized public disclosure. For example, if a disgruntled employee posts the algorithm and location of the keys on the Internet, the security of the algorithm is lost. As such, the risk to security systems is not just from outsider breaking the security of the algorithm, but also from an insider intentionally compromising the integrity of the security system.

Therefore, a need exists for a security device architecture that at least partially overcomes one or more of the above mentioned security issues.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 27 is a logic diagram of an embodiment of a method for protecting cryptographic keys and corresponding rules during loading from OTP memory using obfuscation and de-obfuscation in accordance with the present disclosure;

FIG. 28 is a logic diagram of an embodiment of a method for protecting cryptographic keys and corresponding rules during loading to static segments of a key store memory and a rule set memory using obfuscation and de-obfuscation in accordance with the present disclosure;

FIG. 29 is a logic diagram of an embodiment of a method for protecting cryptographic keys and corresponding rules during a read access to static segments of a key store memory and a rule set memory using de-obfuscation in accordance with the present disclosure;

DETAILED DESCRIPTION

Figure 1:
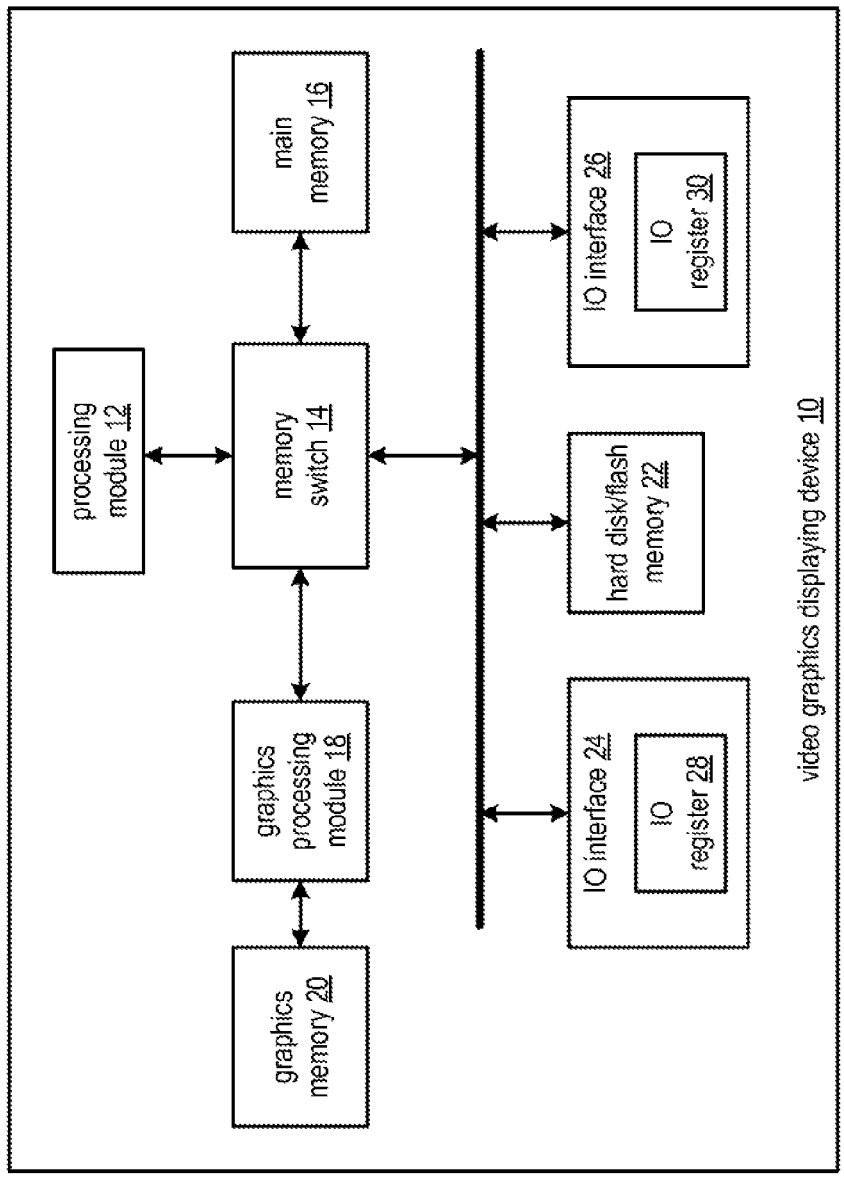
FIG. 1 is a schematic block diagram of an embodiment of a media processing device in accordance with the present disclosure.

FIG. 1 is a schematic block diagram of an embodiment of a media processing device 10 that includes a processing module 12, a memory switch 14, main memory 16, a graphics processing module 18, graphics memory 20, a hard disk and/or flash memory 22 (or other non-volatile storage component), and input/output (IO) interfaces 24 and 26. Each of the IO interfaces 24 and 26 includes an IO register 28 and 30, respectively. Note that the media processing device 10 may be a computer, a laptop computer, a tablet computer, a smartphone, a video game console, an optical disk player, a portable digital audio/video player, etc. and may include multiple JO interfaces 24 and 26. Further note that each JO interface 24 and 26 may include a plurality of JO registers 28 and 30.

The processing module 12 may be a single processing device or a plurality of processing devices. Such a processing device may be a microprocessor, microcontroller, digital signal processor, microcomputer, central processing unit (CPU), graphics processing unit (GPU), field programmable gate array (FPGA), programmable logic device, state machine, logic circuitry, analog circuitry, digital circuitry, and/or any device that manipulates signals (analog and/or digital) based on hard coding of the circuitry and/or executable instructions. The processing module may have an associated memory and/or memory element, such as the main memory 16, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-32.

In an example of operation, one or more of the IO interfaces 24 and 26 receives an instruction to display a media file (e.g., a video file, an audio file, or a combination thereof). The media file may be from an optical disk, stored in the hard disk and/or flash memory, received from a satellite receiver, received from a cable set top box, streamed wirelessly via a cellular data connection or via a wireless local area network (WLAN), and/or any other source of content data. Note that the one or more of the JO interfaces 24 and/or 26 may receive the media file. The media file is encrypted using a particular encryption program and one or more cryptographic keys as prescribed by one or more media standards.

In this example, the processing module 12 coordinates the retrieval of the media file from the main memory 16, the hard disk and/or flash memory 22, the IO interface 24 and/or 26, and/or other source. The encrypted media file may include video data, audio data, video graphics data and/or any other type of data requiring security. The processing module 12 evokes a cryptographic client algorithm (e.g., RSA, DES, etc.) and retrieves a cryptographic key from a secure memory location (e.g., a privileged memory). The secure memory location will be described below with reference to one or more of FIGS. 2-32.

The processing module 12 decrypts the encrypted data using the cryptographic client algorithm and the cryptographic key to produce decrypted data. The decrypted data is provided the graphics processing module 18. The graphics processing module 18 may be a graphics card, a graphics engine, a graphics processor, a combination thereof, and/or any other device for rendering video data. In this example, the graphics processing module 18 converts the decrypted data into video data and stores it in the graphics memory 20 for subsequent display.

The media processing device 10 has three classes of memory access. The most secure class allows access to the system memory (e.g., main memory 16 and/or the hard disk and/or flash memory 22) and to IO devices via the IO interfaces 24 and 26; allows access to the graphics memory 20 (e.g., frame buffer); and allows access to the secure memory location. The next level of secure access allows access to the system memory and to IO devices via the IO interfaces 24 and 26. The third access level allows access to system memory.

Figure 2:
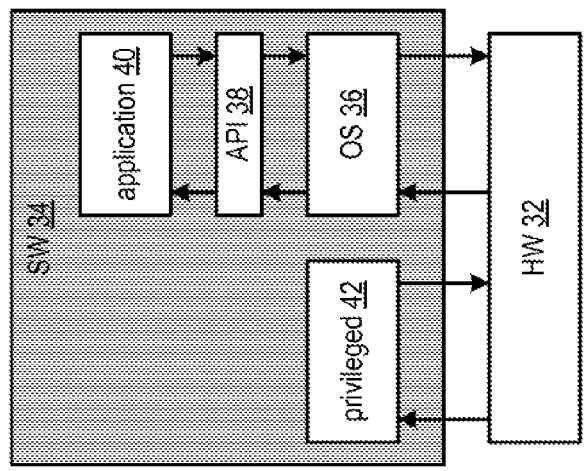
FIG. 2 is a schematic block diagram of an embodiment of a device in accordance with the present disclosure.

FIG. 2 is a schematic block diagram of an embodiment of a device that includes a hardware (HW) section 32 (e.g., the processing module 12, the memory switch 14, the graphics processing module 18, IO interfaces 24 and 26, etc.) and a software (SW) section 34 that is stored in the system memory (e.g., main memory 16 and/or the hard disk and/or flash memory 22). The software section 34 includes one or more operating systems (OS) 36, application programming interface (API) section 38, an application section 40, and a privileged section 42. The software section 34 may be stored in the memory of device (e.g., the main memory 16, the graphics memory 20, the hard disk/flash memory 22, and/or the IO registers 28 and 30 of device 10). The privileged section 42 may be within the memory of the device and/or at least partially within a one-time programmable memory.

Figure 3:
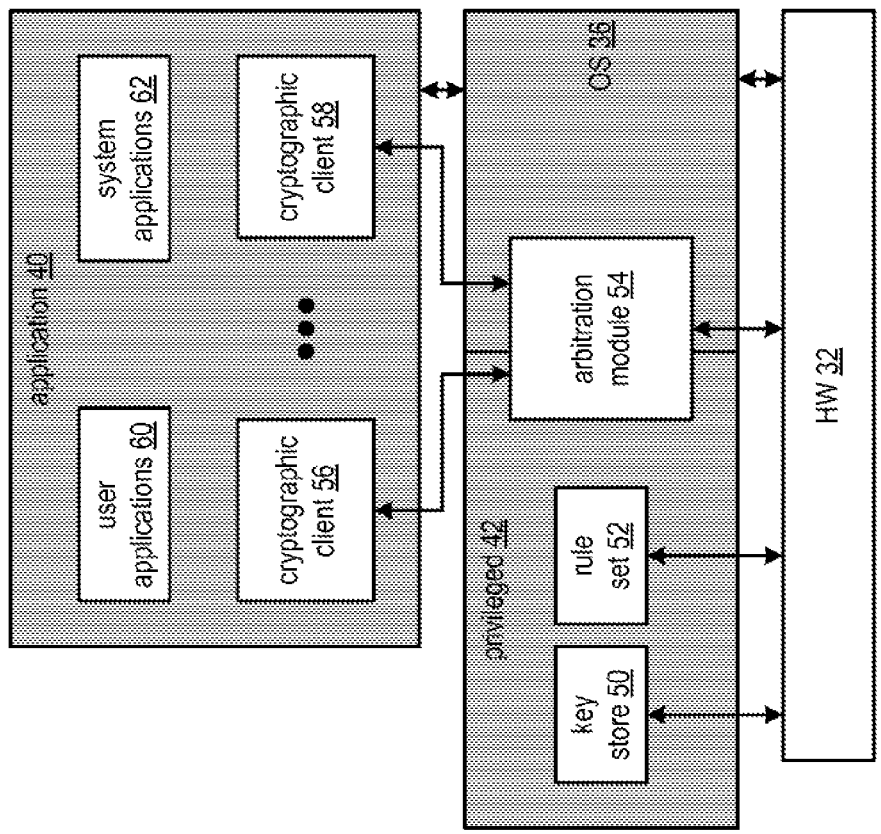
FIG. 3 is a schematic block diagram of another embodiment of a device in accordance with the present disclosure.

FIG. 3 is a schematic block diagram of another embodiment of the device 10 that includes the hardware section (HW) 32 and the software section (SW) 34. In this embodiment, the software section 34 includes application section 40, an operating system 36, and the privileged section 42. The application section 40 includes a plurality of user applications 60, a plurality of system applications 62, and a plurality of cryptographic client applications 56-58. The plurality of cryptographic applications can implement any of a variety of standard or proprietary cryptographic algorithms, such as AES (advanced encryption standard), DES (data encryption standard), 3DES, Multi-2 encryption, DVB (digital video broadcasting), C2 (cryptomeria cipher), CSS (content scramble system), MDMI (HDCP), 1394 (M6), RSA, ECC (elliptical curve cryptography), Register, any variations thereof, any further versions thereof, and/or any new encryption standards or techniques.

The privileged memory section 42 may be implemented using one or more one-time programmable (OTP) memories, random access memory (RAM), and/or read only memory (ROM). The OTP memory may be used to store a default set of the cryptographic keys and a rule set section 52. The key store section 50 stores one or more cryptographic keys for one or more of the cryptographic clients in an OTP memory, RAM, and/or ROM. The key store section 50 may include memory blocks, where one or more blocks store a cryptographic key. The rule set section 52 stores rules for accessing the key store section 50. The various rules will be described in greater detail with reference to at least some of FIGS. 4-32.

The device of FIG. 3 also includes an arbitration module 54, which may be part of the operation system 36, stored in the privileged memory 42, and/or a separate module (e.g., a stand-alone state machine, a stand-alone processor, etc.). Regardless of its location, the arbitration module 54 coordinates access to the key store section 50 based on the rule sets in the rule set section 52. In this manner, access requests must come from authorized firmware components (e.g., real cryptographic clients) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

With such an embodiment, the security of a hardware system and the flexibility of a software system are substantially achieved. For instance, by utilizing a single OTP to store permanent rules for accessing the keys, the vulnerability of a software system is substantially avoided and the inflexibility of a hardware system, which uses hard wired single function for a single standard, is also substantially avoided.

Figure 4:
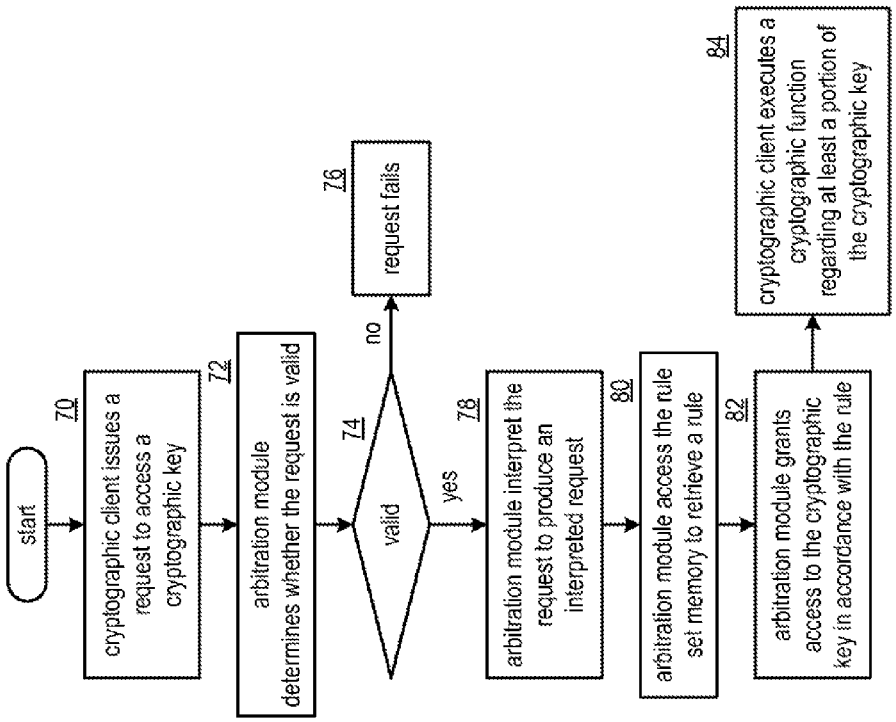
FIG. 4 is a logic diagram of an embodiment of a method for accessing a cryptographic key in accordance with the present disclosure.

FIG. 4 is a logic diagram of an embodiment of a method for accessing a cryptographic key that begins at step 70 where a cryptographic client issues a request to access a cryptographic key of the cryptographic keys stored in the key store section 50. The request should be in a specific format that includes, in this example, a read/write indication, an address of the at least a portion of the cryptographic key, a source or destination of the cryptographic result, and identification of a cryptographic algorithm corresponding to the cryptographic function if the source is adjacent to the destination and is the key store content is a Key/CW or an IV. The method then proceeds to step 72 where a key store arbitration module 54 determines whether the request to access the cryptographic key is valid. For example, if the request is not from an authorized entity (e.g., firmware implementing a function such as a cryptographic client), the arbitration module will indicate that the request is not valid. As such, a hacker's attempt to access the key store section will be invalid and will fail as shown at step 76.

If, however, at step 74 the request is determined to be valid, the method continues at step 78 where the arbitration module interprets the request for access to the cryptographic key to produce an interpreted request. This will be described in greater detail with reference to FIG. 9. The method continues at step 80 where the arbitration module accesses the rule set section 52 based on the interpreted request to retrieve a rule of the set of rules. An example of a rule will be described with reference to FIG. 6.

The method continues at step 82 where the arbitration module grants access to the cryptographic key in accordance with the rule. Note that the rule set may indicate that the access is not to be granted, as such, in accordance with the rule includes denying the request, ignoring the request, or providing random data. The method continues at step 84 where, when access to the cryptographic key is granted, the cryptographic client executes a cryptographic function regarding at least a portion of the cryptographic key to produce a cryptographic result.

Figure 5:
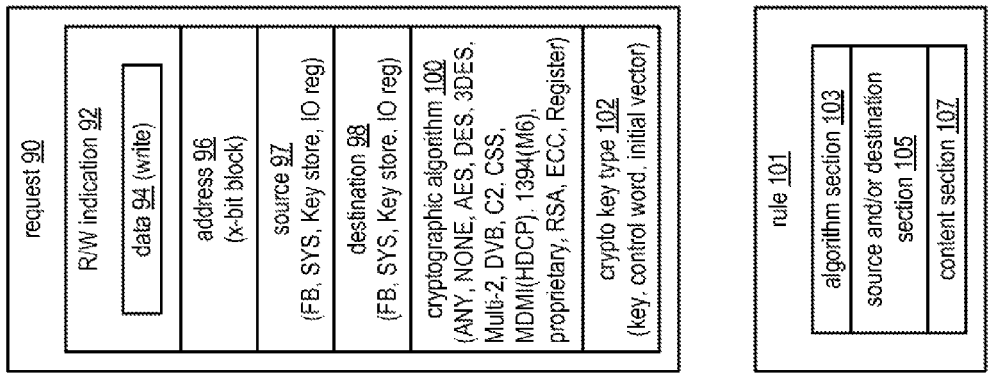
FIG. 5 is a diagram of an example of a request in accordance with the present disclosure.

FIG. 5 is a diagram of an example of a request 90 that includes a read/write (R/W) indication 92, an address 96, a source 97, a destination 98, identity of the cryptographic algorithm 100 (e.g., ID of the cryptographic client), and the cryptographic key type. If the R/W indication 92 is for write request, the request will also include the data 94 (e.g., a cryptographic key, a code word, or an initial vector) to be written. The address section 96 indicates the starting address of a block of x-bits (e.g., 64 bits).

The source section 97 indicates an initiator of the cryptographic result and the destination section 98 indicates where the cryptographic result will be sent. The valid sources and destinations include the system main memory (e.g., as a frame buffer (FB)), the key store section, the IO registers, and/or the graphics memory. The cryptographic algorithm being used may be identified as ANY, NONE, AES, DES, 3DES, Multi-2, DVB, C2, CSS, MDMI (HDCP), 1394 (M6), RSA, ECC, and/or Register.

In an embodiment, an adjacency rule may be used. For instance, when a particular client initiates an encryption operation, the corresponding rule in the rule set section 52 determines what key blocks in the key store section 50 can be accessed. By the improvement a further bit is included in the rule whereby when the rule is implemented, it determines the order in which the key store blocks may be accessed. More restrictively, a particular sequence of blocks is prescribed. Less restrictively, groups of key store blocks are accessed in a prescribed order.

Figure 6:
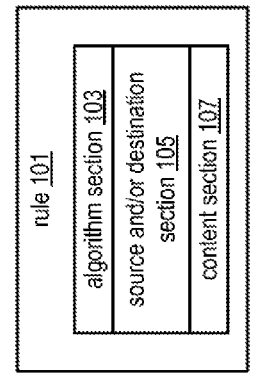
FIG. 6 is a diagram of an example of a rule in accordance with the present disclosure.

FIG. 6 is a diagram of an example of a rule 101 of a set of rules. The rule 101 includes an algorithm section 103, a source and destination section 105, and a content section 107. The algorithm section 103 identifies a valid algorithm that is entitled to access the key store section via a read request and/or a write request. For the given algorithm and request, the destination section 105 indicates one or more valid destinations that this algorithm may send its cryptographic result. The content section 107 identifies a valid cryptographic key type (e.g., a cryptographic key, a control word, and/or an initial vector).

In this embodiment, a rule is a group of bits (e.g., 16) which dictates how a corresponding block (e.g., 64 bits) in the key store may be accessed. By default, since all bits in the OTP default to 0, the blocks that have un-initialized rules provide unlimited access (i.e. no restrictions). The rule set section 52 thus contains bit masks associated to key store blocks. The bit mapping for rules is as follows:

| Field | |
|---|---|
| Read Algorithm | See Algorithm List |
| Write Algorithm: | See Algorithm List |
| Destination | 110b = FB |
| | 101b = SYS, /IO |
| | 011b = Key_Store |
| | 000b = no output |
| Content Type | 1b = CW or Key |
| | 0b = IV |
| Source | 110b = FB |
| | 101b = SYS, /IO |
| | 011b = Key_Store |
| | 000b = no output |
| Adjacent | 0 = unrestricted, |
| | 1 = must be Adjacent |

Note: if Algorithm = ANY then bit {8, . . . , 15} of the rule are ignored.

TABLE 2

| Algorithm | Description |
|---|---|
| ANY | Any Algorithm is permitted (note 00000b = OTP default). |
| AES | ECB, CBC, CTR, OFB, CFB |
| CSS | |
| DES, 2DES | ECB, CBC |
| 3DES | ECB, CBC |
| Multi-2 | |
| DVB | |
| C2 | |
| MDMI (HDCP) | |
| RSA | |
| ECC | |
| Register I/F | Register Interface |
| Reserved | |
| Reserved | |
| NONE | No Algorithm may access block. |

With respect to an adjacency rule: it provides certain cryptographic clients the ability to write the result of a cryptographic operation back into the key store 50. This is may be useful in cases where the security system makes use of key ladders (e.g., a structure where a key is used to decrypt an encrypted key, the resulting decrypted key may then be used in a subsequent key ladder step or it may be used to decrypt content) and where the key is used to decrypt content is itself the end product of several cryptographic operations. In this context, the adjacent rule is used to enforce a particular order to be adhered to when deriving the key (i.e. the 1st key must be adjacent to step 1 which must be adjacent to step 2, etc. . . . ) where the last step of the ladder culminates with the key intended to decrypt content. Note that the adjacent rule field may contain more than 1 bit to indicate a range of adjacent locations (e.g., 5 bits to provide 32 adjacent locations). For example, instead of the result or an operation being permitted to be written to just the next (i.e. adjacent) location the rule has extra bits allocated that define the permission to write the result to the next N blocks (i.e. a plurality of adjacent locations). This adds flexibility when dealing with a multi stream system where multiple end keys are calculated using the same ladder.

Figure 7:
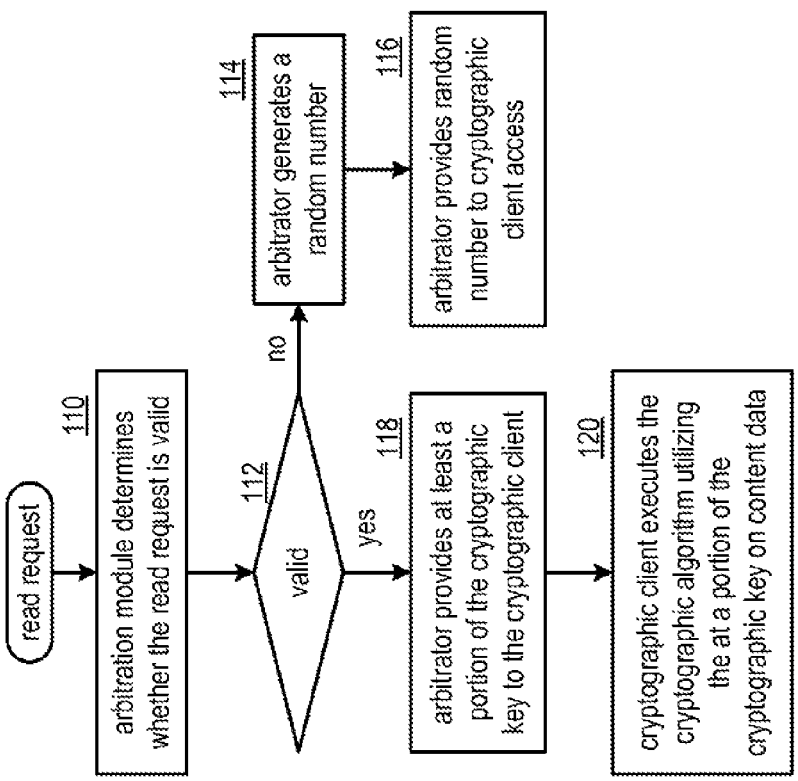
FIG. 7 is a logic diagram of an embodiment of a method for processing a read access request to a cryptographic key in accordance with the present disclosure.

FIG. 7 is a logic diagram of an embodiment of a method for processing a read access request to a cryptographic key that begins at step 110 where the key store arbitration module 54 determines whether the request to read the cryptographic key is valid. This may be done by determining whether the requestor is authorized to make a request in accordance with the rule set stored in the rule set section 52. If, at step 112, the arbitration module 54 determines that the request is not valid, the method continues at step 114 where the arbitration module 54 returns a random number. The method then continues at step 116 where the arbitration module 54 provides the cryptographic client access to the random number.

If the request is valid, the method continues at step 118 where the arbitration module 54 provides at least a portion of the cryptographic key to the cryptographic client. For example, the key may be stored in multiple blocks of the key store section 52 and the arbitration module provides some or all of the blocks the cryptographic client in response to one request. The method continues at step 120 where the cryptographic client executes the cryptographic algorithm utilizing the at least a portion of the cryptographic key on content data to produce encrypted data or decrypted data. Note that, in an embodiment, even though a cryptographic client may make multiple requests and get portions of the key, it typically will use the entire key for a cryptographic operation.

Figure 8:
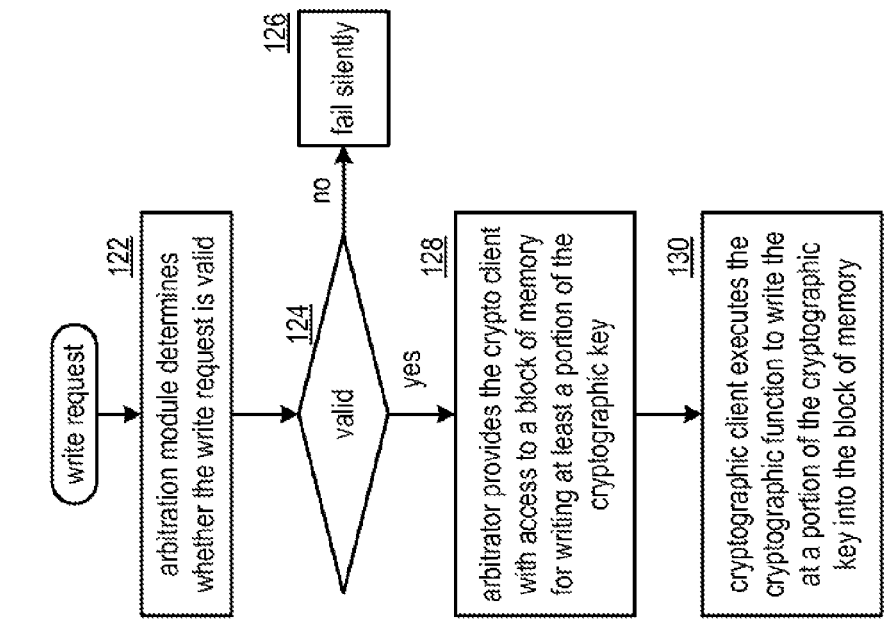
FIG. 8 is a logic diagram of an embodiment of a method for processing a write access request to a cryptographic key in accordance with the present disclosure.

FIG. 8 is a logic diagram of an embodiment of a method for processing a write access request to a cryptographic key that begins at step 122 where the arbitration module determines whether the request to write the cryptographic key is valid. This may be done in accordance with a rule of the rule set stored in the rule set section 52. If, at step 124 it is determined that the request is not valid, the method continues at step 126 where the request fails silently (e.g., no response is given, the request is ignored), or an error status is provided.

If, however, the request is valid, the method continues at step 128 where the arbitration module provides access to a block in the key store section 50 for the at least a portion of the cryptographic key for the cryptographic client. The method continues at step 130 where the cryptographic client executes the cryptographic function to write the at least a portion of the cryptographic key into the block of the key store section 50.

Figure 9:
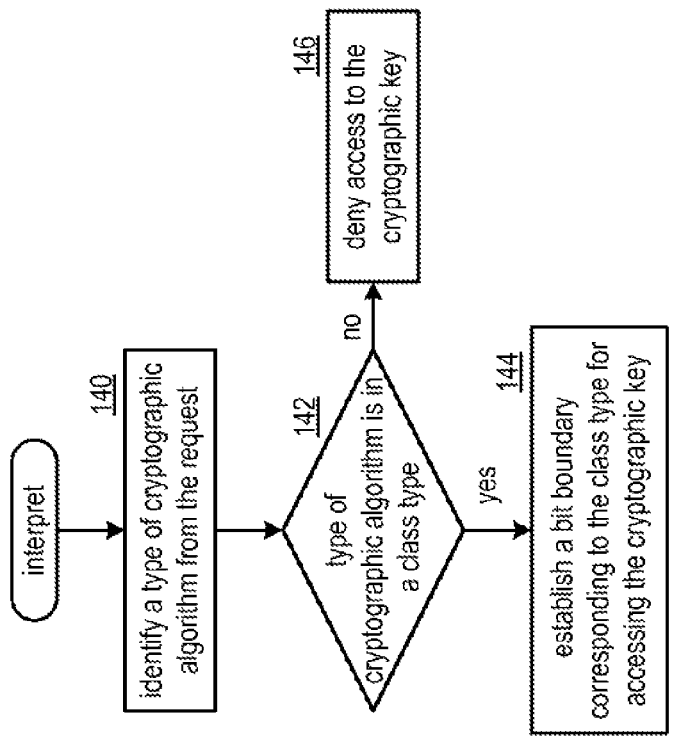
FIG. 9 is a logic diagram of an embodiment of a method for interpreting a request to a cryptographic key in accordance with the present disclosure.

FIG. 9 is a logic diagram of an embodiment of a method for interpreting a request to a cryptographic key that begins at step 140 where the arbitration module 54 identifies a type of cryptographic algorithm from the request to access the cryptographic key. For example, cryptographic algorithms may be grouped into type categories. As a specific example, a first type may include ANY, DES, DVB, C2, CSS, M6, Multi-2, HDCP, Register; a second type may include AES, 3DES, ECC; a third type may include RSA; and a fourth type many include NONE.

The method branches at step 142 depending on whether the type of cryptographic algorithm is in a class type of a plurality of class types. If not, the method continues at step 146 where the request is denied. If, however, the type is in a class, the method continues at step 144 where the arbitration module establishes a bit boundary corresponding to the class type for accessing the cryptographic key. For example, If Algorithm={ANY, DES, DVB, C2, CSS, M6, Multi-2, HDCP, Register} then the Key Store may be accessed on a 64 bit boundary; If Algorithm={AES, 3DES, ECC} then the Key Store may be accessed on a 128 bit boundary; If Algorithm={RSA} then the Key Store may be accessed on a 1024 bit boundary; and If Algorithm={NONE} then the Key store may be not be accessed on any boundary.

Figure 10:
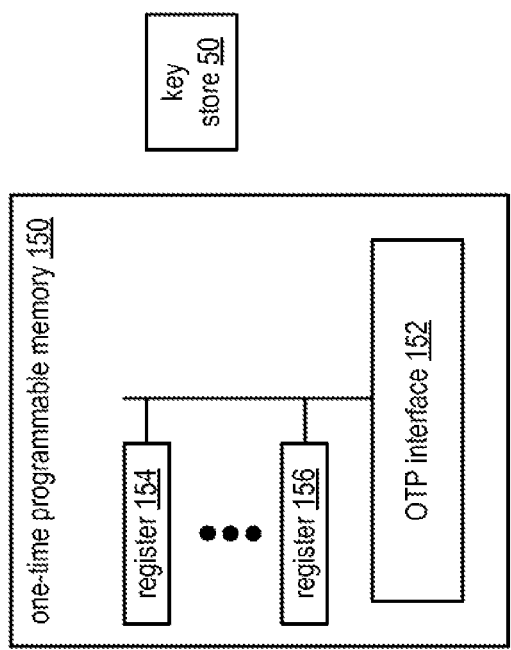
FIG. 10 is a diagram of an example of a one-time programmable memory in accordance with the present disclosure.

FIG. 10 is a diagram of an example of a one-time programmable memory 150 that includes an OTP register interface 152, and a plurality of registers associated with the key store section 50. In an embodiment, the OTP area (16K bits) is used to record Keys, CWs and IVs and various other values organized as 256 blocks of 64 bits each.

The OTP register interface 152 corresponds to a set of registers which permit reading or writing of 64 bits at a time into a specific OTP block. For every block there are 2 bits of associated OTP memory (i.e. the Read Lock Out Bits {0 . . . 255} and the Write Lock Out Bits {0 . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the OTP register interface 152. When the corresponding write lock out bit is set form a=0 to a=1 then the associated 64 bit OTP block may never be written via the OTP register interface 152.

This is a fundamental interlock required to secure secret values into the hardware device. There are a few scenarios:

TABLE 3

| Read Lock Out | Write Lock Out | Use Case |
|---|---|---|
| 0 | 0 | In this case a block of OTP may be left completely unlocked and may be programmed in the field or at the factory with non security critical information. |
| 0 | 1 | In this case a block of OTP may be write protected but not read protected. A typical use for this scenario is to record a MAC address which is not secure (i.e. may be read) but should not be overwritten. |
| 1 | 0 | In this case a block of OTP is read protected but left write able. A typical scenario for this is to provide a mechanism to revoke a system i.e. allow a Key to be over written in the field. |
| 1 | 1 | I this case a block of OTP is read and write protected. A typical scenario for this is to record keys within the OTP and disable f/w form ever reading or overwriting the key. |

Note that even if an OTP block's read write lock out bits are set the block may still be used by a cryptographic client within the hardware device (i.e. H/W blocks may use the key values to perform a cryptographic operation but the value itself may never be exposed).

During the initial writing the cryptographic key to the key store memory at step 50 from the OTP memory 150, the copy may utilize an obfuscation function. For example, blocks of 64 bits (i.e. Block[j]) which are to be written to the OTP memory 150 (i.e. OTP[i]) are obfuscated using a function comprising symmetric binary operators (OP[n]) and a re-mapping function (i.e. [j]→[i]→[j]). The obfuscation function h( ) may be defined as follows:

$$OTP[i]=HKB[x]OP[y]Block[z] \quad \text{EQ. 1}$$

The corresponding de-obfuscation function $h^{-1}()$ implemented between the OTP and the key store section 50 uses the following obfuscation function.

$$KeyStore[z]=OTP[i]OP^{-1}[y]HKB[x] \quad \text{EQ. 2}$$

Note that h( ) is a [j]op[j]→[i] mapping and h–1( ) is a [i]op[j]→[j] mapping which means that the bit ordering in the Block[ ] and the HKB[ ] are different; i.e. if a hacker had access to the Block value and the HKB value then the bit ordering would not correspond.

An obfuscation key block may be a 64 bit pattern written into one or more blocks of the OTP. The obfuscation key block may default to 0x0 . . . 0 and may be programmed uniquely per device, or uniquely per customer, or uniquely per product model or may default to 0x0 . . . 0. In addition, the obfuscation key block should have a similar number of 0's as 1's (+/−10%) (i.e., a non trivial value) to ensure secure obfuscation.

The obfuscation functions may be used to secure the key store loading stage of secure key deployment. It allows for a secure way to embed keys in to the OTP memory 150. This provides an important operational security mechanism which secures cryptographic values within the OTP and provides some security in the factory environment.

Figure 11:
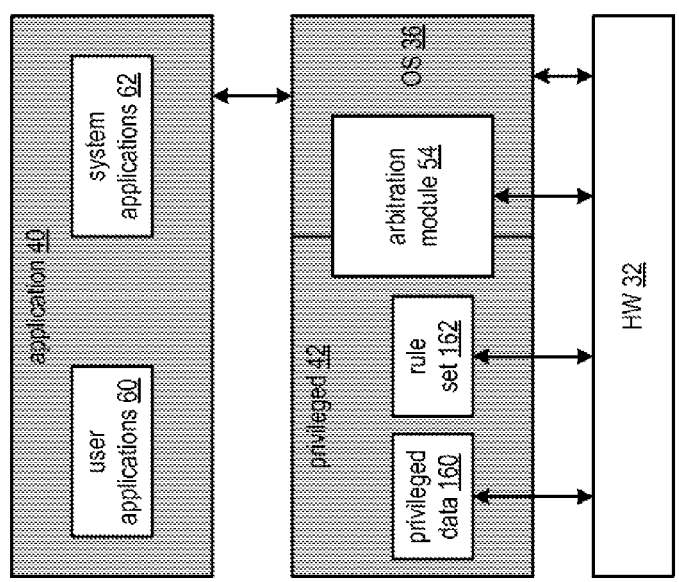
FIG. 11 is a schematic block diagram of another embodiment of a device in accordance with the present disclosure.

FIG. 11 is a schematic block diagram of another embodiment of the device 10 that includes the hardware section (HW) 32 and the software section (SW) 34. In this embodiment, the software section 34 includes application section 40, an operating system 36, and the privileged section 42. The application section 40 includes a plurality of user applications 60 and a plurality of system applications 62.

The privileged memory section 42, which may be implemented using one or more one-time programmable memories such as the OTP memory 150, includes a privileged data section 160 (e.g., one embodiment of the key store section 50) and a rule set section 162 (e.g., one embodiment of the rule set section 52). The privileged data section 160 stores data that is of a privileged nature and should not be accessible to a user of the device or to a hacker. Such data includes one or more cryptographic keys for one or more of the cryptographic clients, other device security features, etc. The privileged data section 160 may include memory blocks, where one or more blocks store a privileged data element. The rule set section 162 stores rules for accessing the privileged data section 160.

The device 10 of FIG. 11 also includes the arbitration module 54, which may be part of the operating system 36, stored in the privileged memory 42, and/or a separate module (e.g., a stand-alone state machine, a stand-alone processor, etc.). Regardless of its location, the arbitration module 54 coordinates access to the privileged data section 160 based on the rule set of the rule set section 52. In this manner, access requests must come from authorized firmware components (e.g., real cryptographic clients, operating system firmware functions, other device security functions, etc.) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

Figure 12:
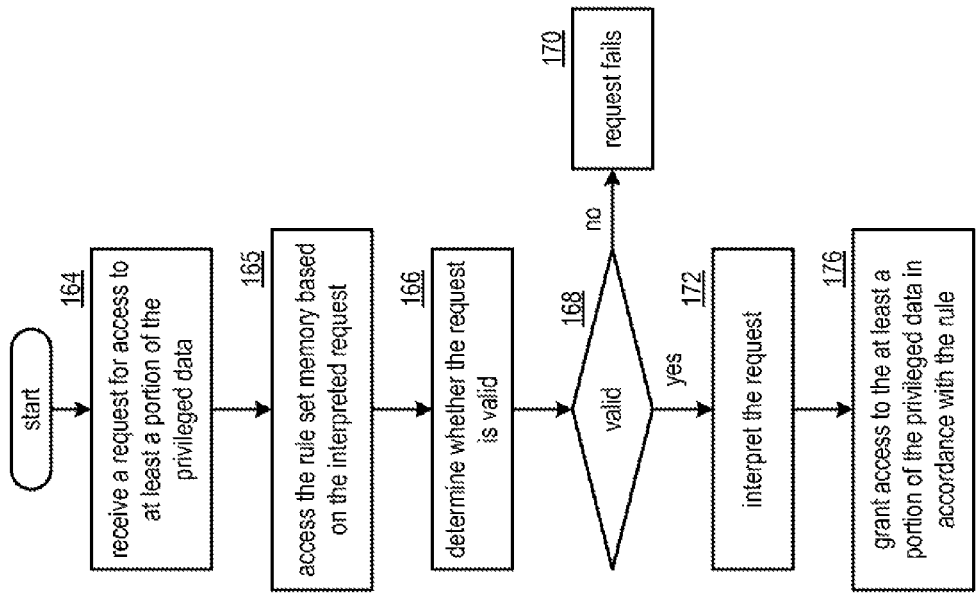
FIG. 12 is a logic diagram of an embodiment of a method for accessing privileged memory in accordance with the present disclosure.

FIG. 12 is a logic diagram of an embodiment of a method for accessing privileged memory that begins at step 164 where the arbitration module 54 receives a request for access to at least a portion of the privileged data of the privileged data section 160. The method continues at step 165 where the arbitration module 54 accesses the rule set section 162 based on the interpreted request to retrieve a rule of the set of rules. Note that a rule of the set of rules includes an algorithm section that identifies one or more valid algorithms, a destination section that identifies a valid destination, and a content section that identifies a valid privileged data type.

The method continues at step 166 where the arbitration module 54 determines whether the request is valid. This may be done by accessing the rule set based on the requestor and the type of request (e.g., read privileged data and/or to write privileged data). In addition, the arbitration module may verify the format of the request to insure that includes a read/write indication, an address of the at least a portion of the privileged data, and an indication regarding use of the privileged data. If any of these checks fail, the request is invalid and the method proceeds to step 170 via step 168, where the request fails. If, however, the request is valid, the method continues at step 172 where the arbitration module 54 interprets the request to produce an interpreted request. The interpretation will be described in greater detail with reference to FIG. 15. The method continues at step 176 where the arbitration module 54 grants access to the at least a portion of the privileged data in accordance with the rule.

Figure 13:
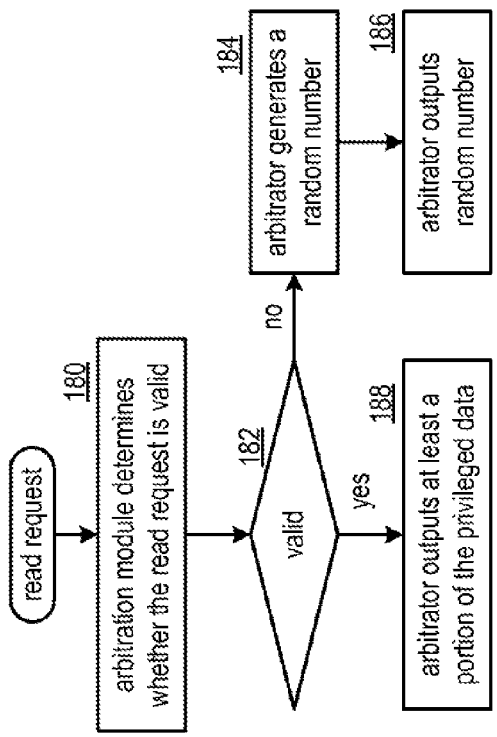
FIG. 13 is a logic diagram of an embodiment of a method for processing a read request to access privileged memory in accordance with the present disclosure.

FIG. 13 is a logic diagram of an embodiment of a method for processing a read request to access privileged memory that begins at step 180 where the arbitration module 54 determines whether the request to read is valid. This may be done by accessing an appropriate rule from the rule set. The method branches at step 182 depending on whether the request is valid. If not, the method continues at step 184 where the arbitration module 54 generates a random number. The method continues at step 186 where the arbitration module 54 outputs the random number as the at least a portion of the privileged data. When the request to read is valid, the method continues at step 188 where the arbitration module 54 outputs the at least a portion of the privileged data.

Figure 14:
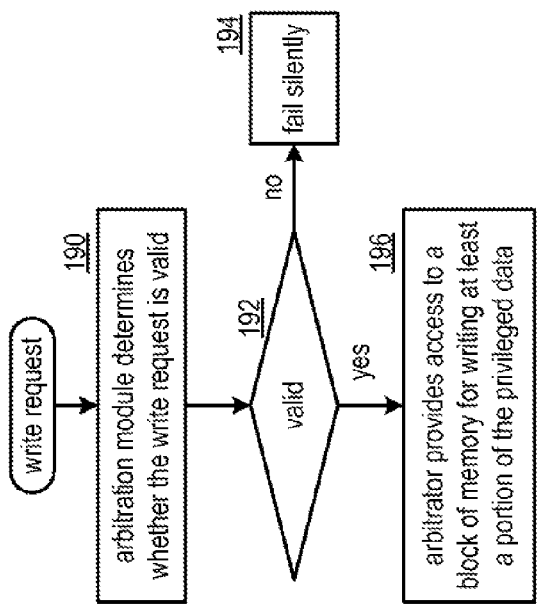
FIG. 14 is a logic diagram of an embodiment of a method for processing a write request to access privileged memory in accordance with the present disclosure.

FIG. 14 is a logic diagram of an embodiment of a method for processing a write request to access privileged memory that begins at step 190 where the arbitration module 54 determines whether the request to write is valid. This may be done by accessing an appropriate rule from the rule set. The method branches at step 192 depending on whether the request is valid. If not, the request fails silently at step 194. When the request to write is valid, the method continues at step 196 where the arbitration module 54 provides access to a block of memory in the privileged memory for the at least a portion of the privileged data.

Figure 15:
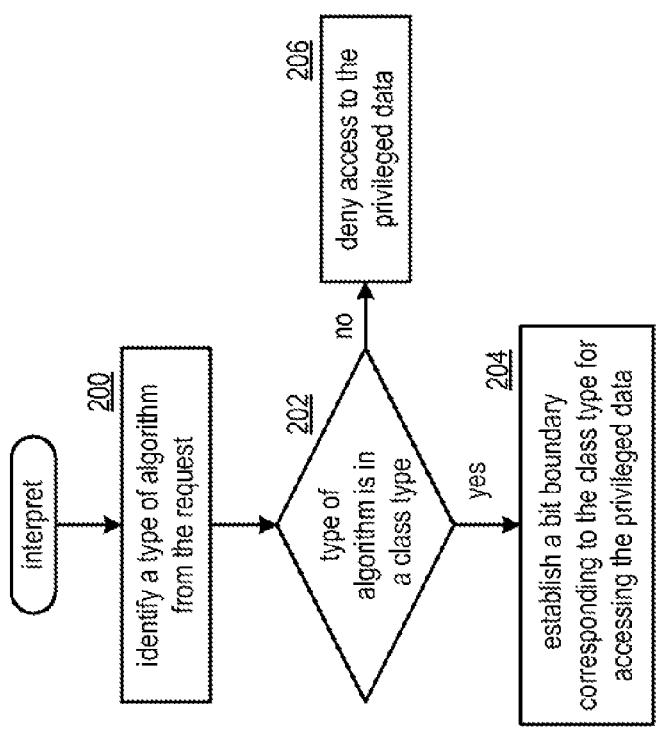
FIG. 15 is a logic diagram of an embodiment of a method for interpreting a request to access privileged memory in accordance with the present disclosure.

FIG. 15 is a logic diagram of an embodiment of a method for interpreting a request to access privileged memory that begins at step 200 where the arbitration module 54 identifies a type of algorithm from the request (e.g., a system level application, an operating system function, a cryptographic algorithm, etc.). The method continues at step 202 where the arbitration module 54 determines whether the type of algorithm making the current request is within one of the types of algorithms. When it is not, the method continues at step 206 where the request is denied. When the type of algorithm is in a class type of a plurality of class types, the method continues at step 204 where the arbitration module 54 establishes a bit boundary corresponding to the class type. For example, a first class may access the privileged memory a block at a time, a second class may access the privileged memory x-blocks at a time, etc.

Figure 16:
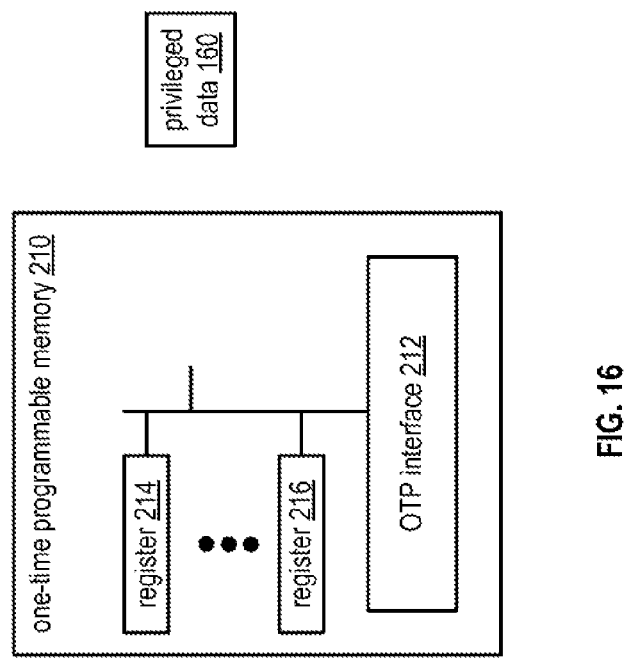
FIG. 16 is a diagram of another example of a one-time programmable memory in accordance with the present disclosure.

FIG. 16 is a diagram of another example of one or more OTP memories 210 (analogous to OTP memory 150) that includes the privileged data section 160, an OTP register interface 212, and a plurality of registers 214-216. In an embodiment, the OTP area (16K bits) is used to record Keys, CWs and IVs and various other values organized as 256 blocks of 64 bits each. The OTP register interface 212 corresponds to the set of registers 214-216 which permit reading or write 64 bits at a time into a specific OTP block. For every block there are 2 bits of associated OTP memory (i.e. the Read Lock Out Bits {0 . . . 255} and the Write Lock Out Bits {0 . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the register interface 212. When the corresponding write lock out bit is set form a=0 to a=1 then the associated 64 bit OTP block may never be written via the register interface.

A further embodiment may include an additional multi-bit field for encrypt/decrypt that specifies whether a cryptographic client is required to perform an encrypt or decrypt operation (e.g., ANY=00, Encrypt=10, Decrypt=01, NONE=11). A least constraining state is the 00 (un-programmed state) and a most constraining state is 11 (None). Another embodiment may include increasing the size of the read and write algorithm field from 4 bits to 6 bits to specify 64 different algorithms, which allows for many more algorithms to be added.

In another embodiment, a skip function may be used to reduce the number of one time programming (OTP) steps required to populate a key store section by loading one root key into the key store section and then having the keys for other sections of the key ladder calculated from the root rather than having them all loaded during successive steps of the OTP process. In this way, certain OTP steps are obviated.

In yet another embodiment, a repeat function may be used to avoid redundancy. For instance, the OTP block includes an indicator stored with certain of the rules in the rule set section to indicate whether that rule is to be repeated to load it in other locations in the key store ladder. Once again, this obviates the requirement of having an OTP step for every location in the key store ladder.

In a further embodiment, an Encrypt/Decrypt rule may be used. In particular, a pair of bits are added to each rule which signify that the client can encrypt and decrypt (00), that the client can do one of encrypt and decrypt (1,0) and (0,1), and that the client can copy, but not encrypt or decrypt, the result to another location in the key store section.

In an additional embodiment the adjacency constraint can be expanded to define additional types such as CW/Key, IV, Data, Any, None or other types.

In yet a further embodiment, the type constraint can be expanded to define a range of adjacency, not just the immediate next.

Figure 17:
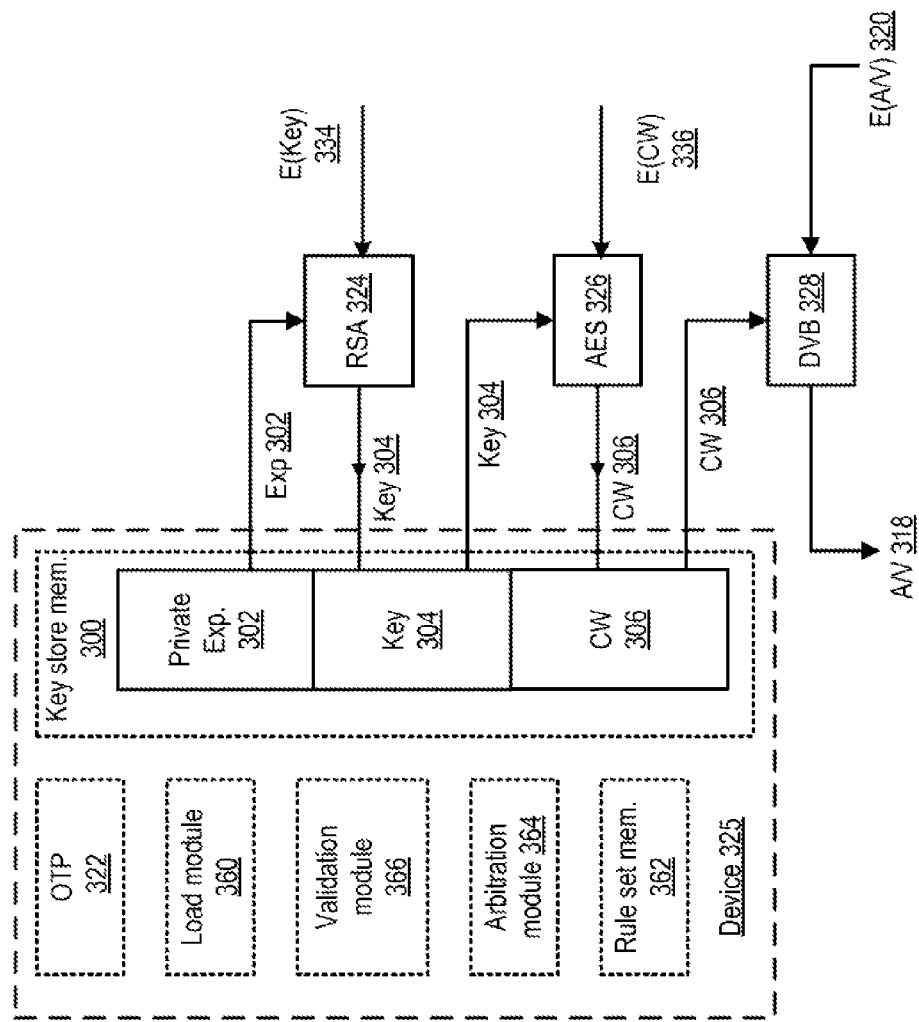
FIG. 17 is a diagram of an example of a key ladder in accordance with the present disclosure.

FIG. 17 is a diagram of an example of a key store section used to implement key ladder in accordance with the present disclosure. In particular, a device 325 (one embodiment of the device 10) is shown that incorporates one or more of the functions and features described in conjunction with FIGS. 1-16 and 18-32. In particular, the device 325 is used to implement a key ladder for use in conditional access (CA), digital rights management (DRM) or other security application in conjunction with Rivest, Shamir, Adelman (RSA) module 324 and Advanced Encryption Standard (AES) module 326 on a single system on a chip (SOC). In this example, a typical broadcast system key ladder is shown where every deployed CA system has a unique Private RSA key, such as private exponent 302. The implementation of such a key ladder on an SOC provides an improvement in security and economy since there is now a single SOC device rather than two or more devices with a communication link between them. The key ladder itself provides several architectural security improvements. A side benefit is that DRM's can be implemented using such a key ladders, the security level is brought up to the standard typically required by CA vendors. The various advantages of the present approach will be apparent to those skilled in the art when presented the discussion that follows.

In the example shown, an application, utility or other software supplies encrypted key 334 and encrypted codeword 336 that are decrypted in the key ladder based on private exponent 302 to generate codeword 306. The codeword 306 is used in this example to descramble an encrypted audio/video (A/V) data 320 such as from a transport stream de-multiplexor (TSD) in digital video broadcast module 328 to generate audio/video data 318 that can be written to a frame buffer memory.

In operation, key store memory 300 stores cryptographic keys of the key ladder. This can include prestored keys such as private exponent 302 used by RSA module 302 to extract key 304 from encrypted key 334. In addition, key store memory 300, such as key store section 50, can store key 304, and codeword 306 generated in AES module 326 by decrypting encrypted codeword 336 based on key 304. Rule set memory 362, such as rule set section 52, stores a set of rules for accessing the cryptographic keys of key store memory 300 used in conjunction with the key ladder. Key store arbitration module 364, such as arbitration module 54, operates based on the rules in rules set memory 362 to control access to key store memory 300. In particular, arbitration module 364 allows reading and writing the keys stored in key store memory 300 only in accordance with the set of rules. Examples of such rules are set forth in conjunction with FIGS. 4 and 7-9 and otherwise, while specific examples are presented below.

In a particular embodiment, there is a different set of rules (constraints) for each of the three portions of the key store memory 300 which dictate how values in that portion may be used. The definition of the ladder is based on rules which are hard coded into one-time programmable (OTP) memory 322, such as OTP memories 150 and 210, rather than being hard wired into a chip. These constraints enforce the specific sequence of operations which is equivalent to the security provided by a hard wired key ladder.

For instance, private exponent portion of key store memory 300 has constraints which enforce the value to be loaded from OTP memory 322 (Write Rule=OTP), the value may only be used by the RSA module 324 (Read Rule=RSA), the value may only be used as a Key (Type=Key), the RSA operation must read a value E(Key) from the frame buffer (Source=FB) and the result of the RSA calculation (Key=(E(Key))$^{\char`\^mod\ n}$) must be written to the key store memory 300 (dest=KS), the RSA operation is a decryption operation (i.e. E/D=D), the location of key 304 must be adjacent to the location of private exponent 302 (adjacent=1).

Similarly, the key portion of key store memory 300 has constraints which enforce the value to be the result of an operation of RSA module 324 (Write Rule=RSA), the value may only be used by the AES module 326 (Read Rule=AES), the value may only be used as a key (Type=Key), the AES operation must read a value E(CW) from the frame buffer (Source=FB) and the result of the AES calculation (i.e. CW=AES(E(CW,Key)) must be written to the key store memory 300 (dest=KS), the AES operation must be a Decryption (i.e. E/D=D) the location of codeword 306 must be adjacent to the location of key 304 (adjacent=1).

In addition, the codeword portion of the key store memory 300 has constraints which enforce the value to be the result of an operation of AES module 326 (Write Rule=AES), the value may only be used by the DVB module 328 (Read Rule=DVB), the value may only be used as a Key (Type=Key), the DVB operation must decrypt content received from an 110 device (i.e. source=I/O) and the resulting decrypted content must be written to the frame buffer (dest=FB), the DVB operation must be a decryption operation (i.e. E/D=D) and the CW 306 may not be used to derive any further key store locations (adjacent=NONE).

The rules can also have fields which allow for decompression of rule set and key values when loading the rule set memory 362 and key store memory 300. These constraints are referred to as the SKIP and REPEAT fields and generally permit 1:N mapping of OTP memory 322 storage to key store memory 300 and rule set memory 362. This allows for more optimum use of OTP memory 322. Examples of such fields are presented below:

SKIP: In the example discussed above, note that only the private exponent 302 has a prestored value which is read from the OTP memory 322. It is typical in key ladders for there to be a root value which is stored within the chip (i.e. persistent) and subsequent values are derived (i.e. have no default value). In this case it would be wasteful to allocate locations in the OTP memory 322 to record default values for other locations in the key store memory and so the SKIP field is used to direct the load module 360 to skip over locations in key store memory 300 that correspond to derived keys (i.e. don't initialize them).

REPEAT: In the example discussed above, note that the granularity of the key store memory may be different for various algorithms (i.e. DVB 328 uses 64 bit codewords, AES uses 128 bit keys and the RSA may use 1024 bit exponents). In order to accommodate the varying granularity the REPEAT field is used to direct the load module 360 to apply the same rule to multiple locations of rule set memory 362.

As previously discussed, device 325 includes OTP memory 322 for storing the prestored key or keys and the set of rules. Load module 360 controls the loading of key store memory 300 with the prestored key or keys and the rule set memory 362 with the set of rules. In an embodiment of the present disclosure, the set of rules includes a signature rule that defines at signature corresponding to at least one of: the set of rules and the at least one cryptographic key. The validation module 366 validates, based on the signature, the loading of the prestored keys in the key store memory 300 and/or the loading of the rule set memory 362. Further details regarding this aspect of the present disclosure will be discussed in conjunction with FIGS. 18 and 19 that follow.

While shown in conjunction with descrambling of broadcast A/V data, the key ladder shown could likewise be used for encrypting or decrypting other media data, multimedia data or other data to be protected. In particular, nearly all CA and DRM systems may be expressed as a key ladder (i.e. they may have more or less stages and/or may use different specific algorithms). The reason for this is that such security systems are based on a root of trust philosophy where trust is propagated though various stages from most trusted to less trusted. A key ladder is a natural extension of standard cryptographic philosophy. There are proprietary systems which operate with Smart Cards or Cable Cards and use secret algorithms and undocumented protocols and are usually associated with set top boxes distributed by Broadcasters where the CA system is used to control access to only valid customers. On the other hand, DRM systems are generally based on published standards like AACS, DTCP, CPRM, etc. These systems use standard published algorithms and licensed device keys and are usually associated with consumer electronics devices like players or networked devices which are distributed as retail devices. One thing CA and DRM systems have in common is that they can both be expressed as a key ladder i.e. they have a root key (usually stored in Non Volatile Memory) which is used to cryptographically qualify derived intermediate keys which are then used to qualify final keys which are used to de-scramble A/V content.

Figure 18:
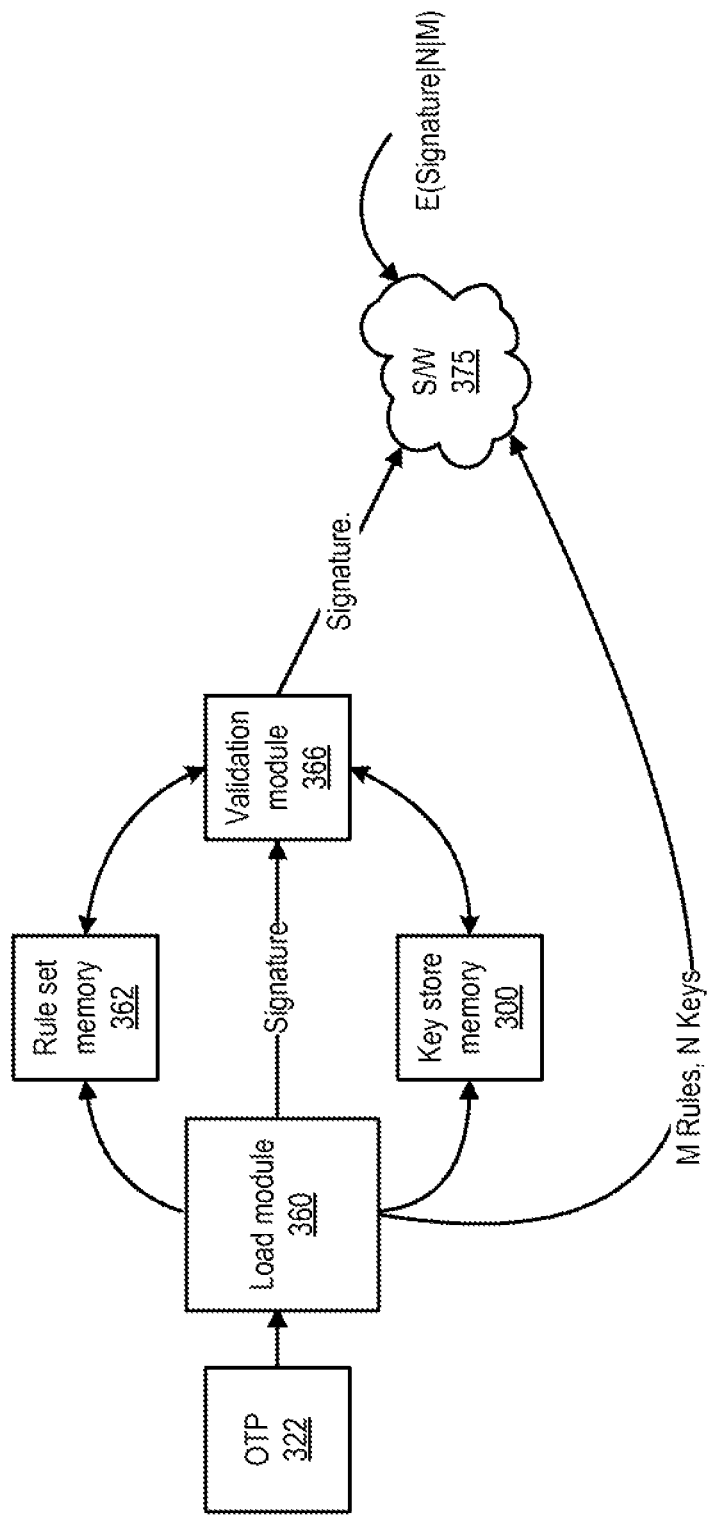
FIG. 18 is a diagram of an example of a device in accordance with the present disclosure.

FIG. 18 is a diagram of an example operation of the device 325 in accordance with the present disclosure. In order to make use of the set of rules and the keys that are stored in OTP memory 322, these values must be loaded in a high speed random access device such as a static random access memory (SRAM). In this embodiment, rule set memory 362 and key store memory 300 are implemented using one or more such memory devices and load module 360 and validation module 366 are implemented via state machines, however, other hardware devices can be used provided that they can be implemented with an appropriate level of security.

An obvious point of attack is the storage of rules and keys. Procedures are put in place to protect against hackers modifying or adding rules or keys. During the loading process, load module 360 reads the OTP memory 322 and determines the number of rules (M), extracts the signature from the signature rule, and then copies the rule set into the rule set memory 362. Along with the rules, the load module 360 will also determine the number of prestored keys (N) and load the prestored keys into the key store memory 300. When complete, the load module 360 will report the number of rules M and keys N which have been loaded to software 375. After the loading is complete, the validation module 366 will receive the signature value from the load module 360 and perform a hardware hash check. For example, the load module 360 can evaluate the signature of the key store memory 300 and the rule set memory 362 and compare it against the signature embedded within the signature rule. If the two signatures do not match the validation module 366 can take action to disable access to the keys and the rule set (e.g. erase the key store memory 300 and the rule set memory 362).

If the keys and rule set are validated, the validation module 366 will also make the signature value available to a software function 375 to perform a software hash check. The software function 375 can be a separate utility or embedded in the operating system, an application or in other software. Software 375 can be implemented as a process on a single SOC that includes the other components presented in conjunction with FIG. 17 or can run on another device. Software 375 reads the signature calculated by the load module 360, the number of rules M and number of keys N, and uses this information to construct a message digest and perform a asymmetric signature of the contents of the key store memory 300 and rule set memory 362. For example an RSA-based signature check may be defined as:

Digest=Hash value|#rules|#keys

Signature=Digest$^{mod\ N}$

This mechanism allows a trusted authority to define correct signature and number of rules and keys have been processed (i.e. to prevent hackers from altering or adding rules or keys). If this second signature check fails, then the software 375 takes action to disable the system. Note: there are various possible hash functions and various possible asymmetrical functions which may be used.

The rule set can include the following special rules which are used by the load module 360:

End of Rules Rule (EOR): there is a default Rule (ALL Zeros) which defines the end of rules within the OTP memory 322. This rule is intentionally set be equivalent to the default value of the OTP memory 322 i.e. in an un-initialized chip the 1st rule encountered would be an End Of Rules rule (EOR) indicating there are no rules defined. This mechanism also permits additional rules to be defined after some rules have been defined i.e. the unused space may be used to add additional rules after the chip has been provisioned.

Signature Rule: this is a custom rule which is used to define the signature of the rules and keys stored in OTP memory 322. It is assumed that a typical attack vector would be for a hacker to attempt to modify the rules in OTP memory 322 and so this mechanism is used to define the expected signature of the contents of the rule set and keys stored into the OTP memory 322 thus providing a mechanism to assure the integrity of rule set and keys as they reside in the OTP memory 322. The signature algorithms can be CRC32, SHA1, SHA256, or other block codes, checksums or error detection algorithm.

NULL Rule: this rule is provided to define an unused rule which may be used to fill the rule storage in OTP memory 322, i.e. to disable the ability to add additional rules after provisioning.

The device architecture of the present disclosure also provides the option to implement multiple CA and DRM systems on the same system on a chip (SOC). This is an important distinction where a customer could field a system containing a single SOC which is provisioned with keys and key ladders which implement more than one CA or DRM system. This provides the customer with a remarkable economy and flexibility since the CA/DRM systems can share resources and co-exist at the same time.

It is common in the CA industry to have breaches of security. The typical response in this situation in prior art removable CA systems is to distribute new smart cards or cable cards to customers. These removable CA systems typically implement a new key ladder or contain new keys. In the system of the present disclosure, an 'End of Rules' rule can be implemented that defines un-programmed space in the rule and key areas of the OTP memory 322. In the case of a security breach, it is feasible to download new rules and new keys to update the OTP memory 322 of previously fielded SOC chips, in effect downloading a new CA or DRM system to previously fielded systems. This provides the customer with a remarkable economy and flexibility since the CA/DRM systems can be renewed without a large expense. The Renewed CA or DRM system may be downloaded to fielded products via various communication channels (for example Cable/Satellite/Terrestrial RF links, the Internet, or via media such as DVD's and BD disks).

It is also common to selectively disable fielded products usually because they have been identified as being used by hackers; this is referred to as revocation. Since the architecture of the present disclosure is based on the contents of OTP memory 322 and these contents can be used to record unique chip ID's. It is possible to identify and disable individual SOC devices. The hard coded key ladder approach provides new methods for revoking devices i.e.:

Keys may be changed
(i.e. without the new key the SOC stops working)
Key Ladders may be changed
(i.e. without the new Ladder the SOC stops working)
Signature Check
(i.e. without the new Signature the SOC stops working)

In effect since the architecture of the present disclosure support renewability, this creates new and flexible methods for revoking SOC's.

Figure 19:
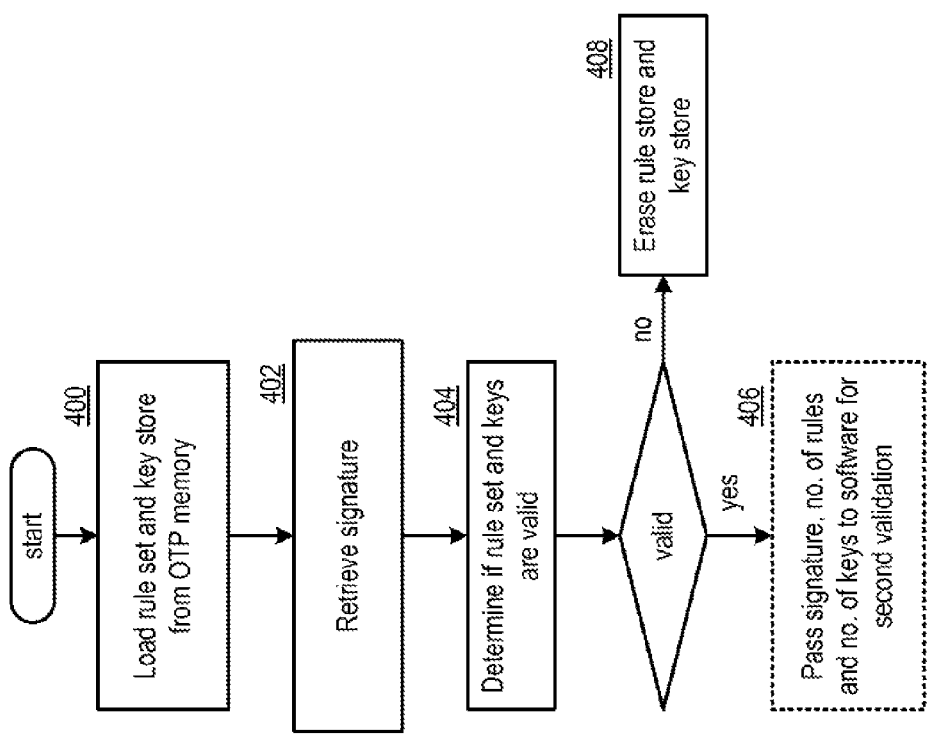
FIG. 19 is a logic diagram of an embodiment of a method for loading and validating keys and rule sets in accordance with the present disclosure.

FIG. 19 is a logic diagram of an embodiment of a method for loading and validating keys and rule sets in accordance with the present disclosure. In particular a method is presented for use in conjunction with one or more functions and features presented in conjunction with FIGS. 1-18 and 20-32. In step 400, at least one cryptographic key is loaded from at least one OTP memory to a key store memory. In addition, a set of rules from the OTP memory is loaded in a rule set memory. The set of rules can include a signature rule that defines a first signature. In step 402, the first signature is retrieved. In step 404, the validity of the set of rules stored in the rule set memory the cryptographic key or keys stored in the key store memory is determined. In step 408, the key store memory and the rule set memory are erased, based on a failed validation of at least one of: the set of rules stored in the rule set memory; and the cryptographic key or keys stored in the key store memory.

In step 406, the number of rules in the set of rules is determined along with the number of cryptographic keys. The first signature, and the number of rules in the set of rules stored in the rule set memory and the number of cryptographic keys stored in the key store memory are passed for further validation, such as a second security check.

In an embodiment of the present disclosure, step 404 includes: determining a second signature based on the set of rules stored in the rule set memory, and the at least one cryptographic key stored in the key store memory; comparing the first signature to the second signature; and determining the failed validation when the second signature does not match the first signature.

As described above, in some embodiments, the key usage in a key store memory can be enforced through rules programmed in an OTP memory during the chip/device provisioning stage. In such instances, once the OTP memory is programmed, the key storage usage is fixed, or static, through the entire life of the device. However, in many implementations, the application use cases of key values and other privileged data may change curing the device life cycle. Such changes may not be foreseeable during device design and manufacture. Accordingly, one approach is to provision a large number of key store blocks in the OTP memory to accommodate as many use cases as possible. However, in most applications the many of these key store blocks will not be used, thereby leading to an unnecessarily large key store space. FIGS. 20-26 illustrate a dynamic partitioning scheme to address this problem. For this scheme, the key store memory and rule set memory are implemented at least in part by one or more random access memories, such as SRAM memories. The key store memory is divided into two segments: a static key segment (SKS) and a dynamic key segment (DKS). Likewise, the rule set memory is divided into two segments: a static rule segment (SRS) and a dynamic rule segment (DRS). The SRS is used to store static rules from the OTP memory and the SKS is used to store the keys covered by these static rules. However, it should be noted that while the rules in the SRS are static (that is, cannot be changed), the keys in the corresponding SKS may not be static, and instead may be created or modified during device operation. Thus, the term "static" in "static key segment" alludes to the fact that access to the keys of the SKS is controlled by the static rules of the SRS, rather than implying that the keys themselves are static. In contrast, the DRS is used to store rules that may be dynamically created and/or dynamically changed, and the DKS is used to store keys whose access is controlled by the dynamic rules in the DRS. In either instance, the keys of the SKS and the DKS may be received from a register interface, received from a cipher engine output (e.g., as part of a key ladder operation), obtained from the OTP memory (for the SKS only), and the like.

To illustrate, for a key store memory of 512 blocks total, if the rule set from the OTP memory covers 100 blocks, the SKS will be sized to 100 blocks, and the remaining 412 blocks will be used for the DKS. This approach permits the device to accommodate future expansion of key usage without having to provision an OTP memory sized large enough to permit a worst-case scenario and thus incur unused space in OTP memory in many applications. Further, FIGS. 27-32 illustrate example techniques for ensuring or verifying the integrity of these segmented key store and rule set spaces using obfuscation and cyclical redundancy check (CRC) calculations, as described in greater detail below.

Figure 20:
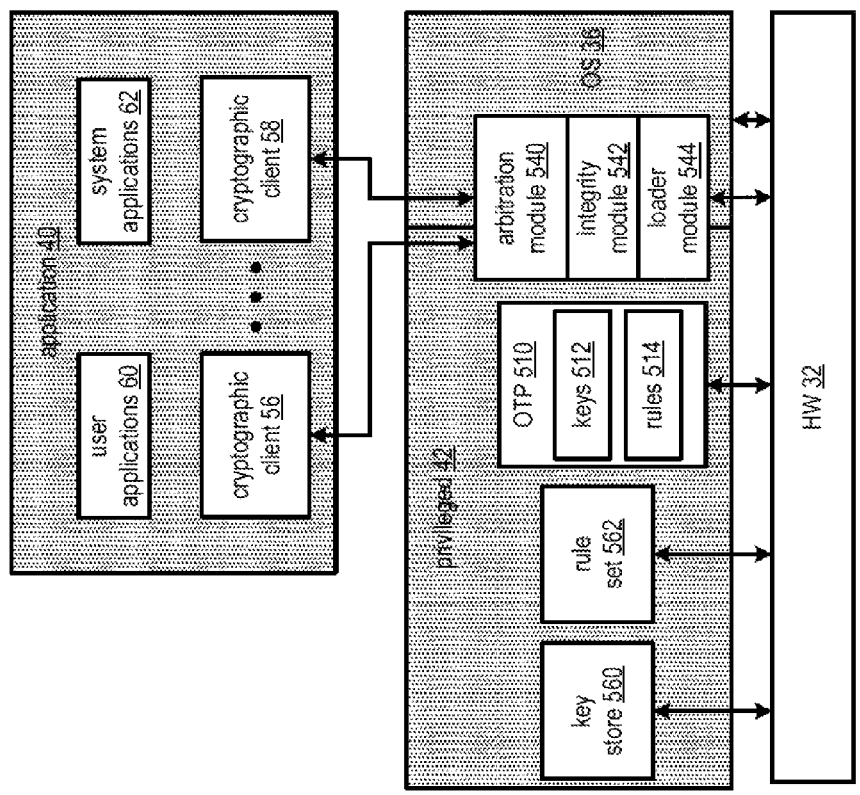
FIG. 20 is a schematic block diagram of another embodiment of a device in accordance with the present disclosure.

FIG. 20 is a schematic block diagram of another embodiment of the device 10 that includes the hardware section (HW) 32 and the software section (SW) 34. In this embodiment, the software section 34 includes application section 40, an operating system 36, and the privileged section 42. The application section 40 includes the plurality of user applications 60, a plurality of system applications 62, and a plurality of cryptographic client applications 56-58. The plurality of cryptographic applications can implement any of a variety of standard or proprietary cryptographic algorithms. The privileged memory section 42 is implemented using one or more one-time programmable (OTP) memories 510, such as OTP memory 150 or OTP memory 210, as well as a key store memory 560 and rule set memory 562 implemented in one or more random access memories, such as one or more SRAMs. The OTP memory 510 is to store a set of keys 512 of cryptographic keys or other privileged data for one or more cryptographic keys and a static rule set 514 of rules for accessing the keys of the keys 512.

The device of FIG. 20 also includes an arbitration module 540 (one embodiment of the arbitration module 54), an integrity module 542, and a loader module 544, each of which may be part of the operating system 36, stored in the privileged memory 42, and/or a separate module (e.g., a stand-alone state machine, a stand-alone processor, etc.). As similarly described above with reference to the arbitration module 54, the arbitration module 540 coordinates access to the key store memory 560 based on the rules in the rule set memory 562 such that access requests must come from authorized firmware components (e.g., real cryptographic clients) and the request must be in a specific manner based on the identity of the requestor as delineated in the rule set. If either fails, the arbitration module 540 will deny the request, ignore the request, or provide random data in response to the request.

The loader module 544 operates during the boot process of the device 10 to copy the keys of the keys 512 in the OTP memory 510 to a static key segment of the key store memory 560 and to copy the rules of the static rule set 514 to a static rule segment of the rule set memory 562. The loader module 544 further operates to load dynamically generated keys and corresponding rules to the dynamic key segment and dynamic rule segment of the key store memory 560 and rule set memory 562, respectively. The operation of the loader module 544 is described in greater detail with reference to FIGS. 21-26.

The integrity module 542 operates to ensure the integrity of the key store memory 560 and rule set memory 562. In some embodiments, the integrity module 542 utilizes obfuscation techniques to obfuscate the data stored in one or both of the key store memory 560 and rule set memory 562 so as to prevent access to the secrets contained therein in the event that a hacker is able to obtain access to the key store memory 560 or the rule set memory 562. Further, in some embodiments, the integrity module 542 utilizes CRC calculations and comparisons to verify the integrity of one or both of the key store memory 560 and the rule set memory 562 to ensure that data contained therein has not been corrupted or otherwise modified without authorization. The operation of the integrity module 542 is described in greater detail with reference to FIGS. 27-32.

Figure 21:
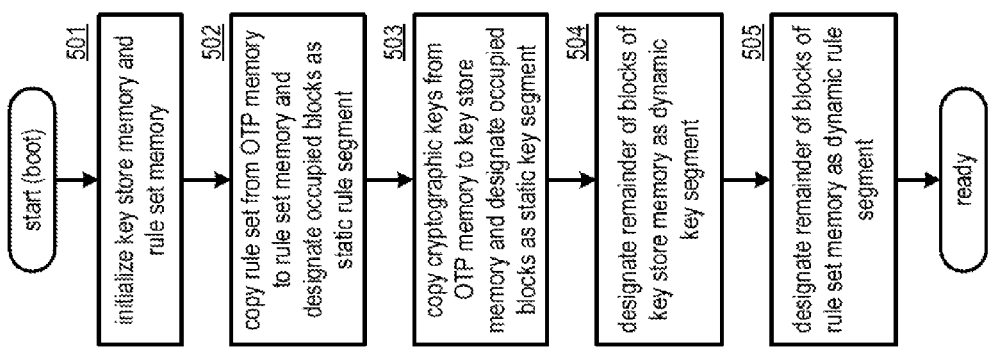
FIG. 21 is a diagram of an example of a partitioning of a key store memory and rule set memory into static and dynamic segments in accordance with the present disclosure.
Figure 22:
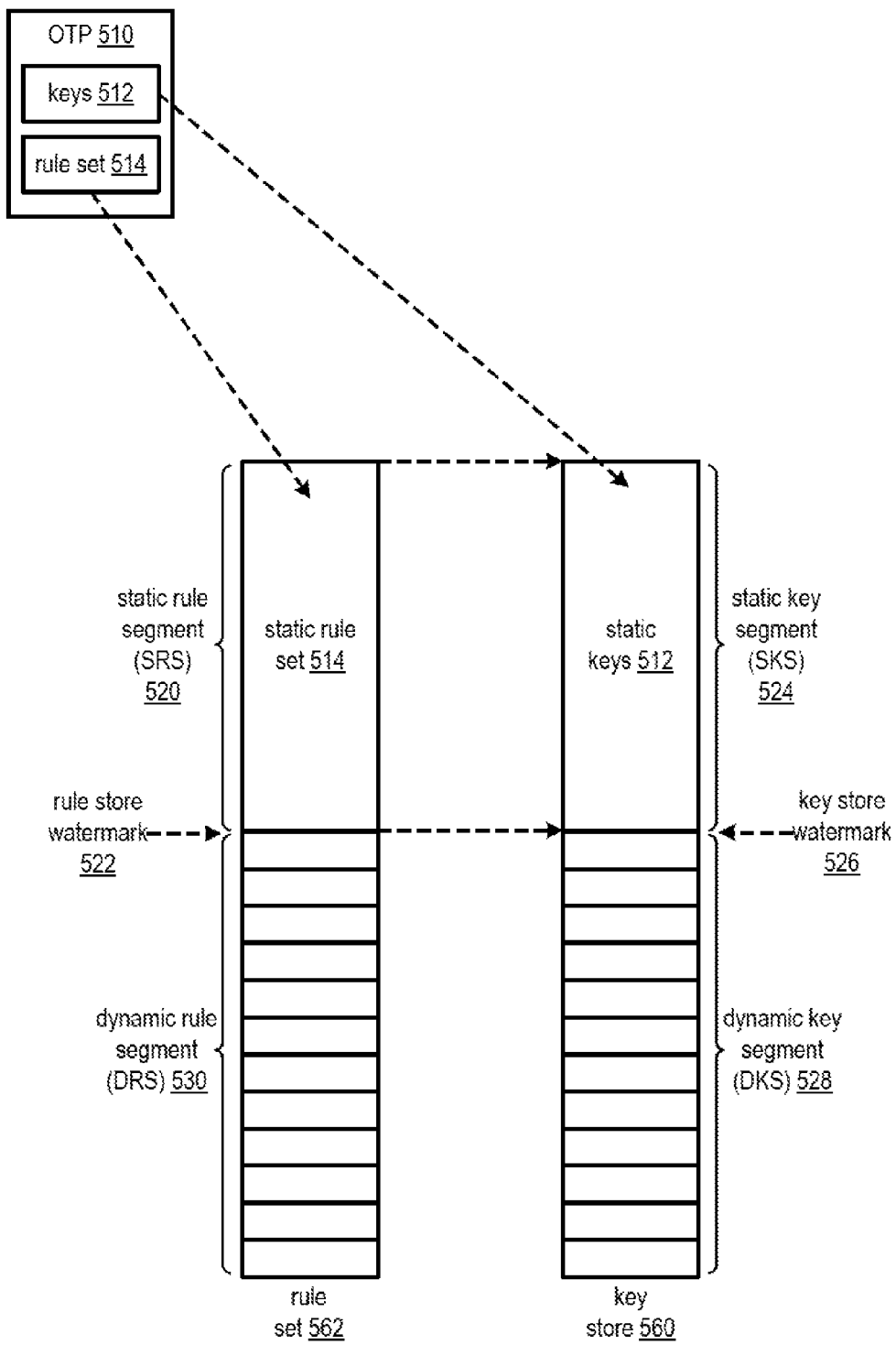
FIG. 22 is a logic diagram of an embodiment of a method for partitioning of a key store memory and rule set memory into static and dynamic segments in accordance with the present disclosure.

FIG. 21 is a logic diagram of an embodiment of a method for provisioning of the key store memory 560 and the rule set memory 562 of the device of FIG. 20 in accordance with the present disclosure and FIG. 22 is a diagram of an example of the provisioning method of FIG. 21. As noted above, the cryptographic keys and corresponding rule sets stored in an OTP memory are more effectively used when transferred to an SRAM or other rapidly-accessed RAM. Accordingly, during a boot process, at step 501 the device 10 initializes the key store memory 560 and the rule set memory 562. This initialization process can include, for example, initializing the RAM used for the memories 560 and 562, writing default values to the blocks of the memories 560 and 562, and the like. To illustrate, the initial rules for the DRS 530 can be set to "NONE" so that none of the cryptographic clients may access the key store blocks of the DKS 528. The method continues to step 502 whereupon the loader module 544 provisions a portion of the blocks of the rule set memory 562 to serve as a static rule segment (SRS) 520 by transferring a copy of the static rule set 514 in the OTP memory 510 to the blocks of the SRS 520 and designating the blocks so occupied as the SRS 520. As part of this provisioning process, the loader module 544 notes the block storing the final rule of the static rule set 514 as the rule set watermark 522 denoting the end of the SRS 520 (and the start of the corresponding dynamic rule segment). Similarly, at step 503 of the method the loader module 544 provisions a portion of the blocks of the key store memory 560 to serve as a static key segment (SKS) 524 by transferring a copy of the keys 512 in the OTP memory 510 to the blocks of the SKS 524 and designating the blocks so occupied as the SKS 524, and then noting the block storing the final key of the keys 512 as the key store watermark 526 denoting the end of the SKS 524 (and the start of the corresponding dynamic key segment).

At the conclusion of this initialization process, the loader module 544 has provisioned the SRS 520 of the rule set memory 562 to statically store the rule set 514 and provisioned the SKS 524 of the key store memory 560 to store the keys 512 governed by the static rules of the SRS 520. As such, at block 504 of the method the loader module 544 may provision the remaining blocks of the key store memory 560, starting at the key store watermark 526, as a dynamic key segment (DKS) 528 for storing cryptographic keys dynamically generated by hardware for temporary use during operation of the device after boot up, and at step 505 the loader module 544 may provision the remaining blocks of the rule set memory 562, stating at the rule set watermark 522, as a dynamic rule segment (DRS) 530 for storing rules for accessing the corresponding dynamic keys of the DKS 528.

Under this segmentation method, the device 10 can accommodate the storage of dynamic keys (that is, keys not intended to persist between power-on cycles of the device) solely in RAM, as opposed to convention implementations whereby the OTP memory is used to store dynamic keys, and thus requiring an excessively large OTP memory in order to accommodate foreseeable dynamic key usage over the life cycle of the device.

Figure 23:
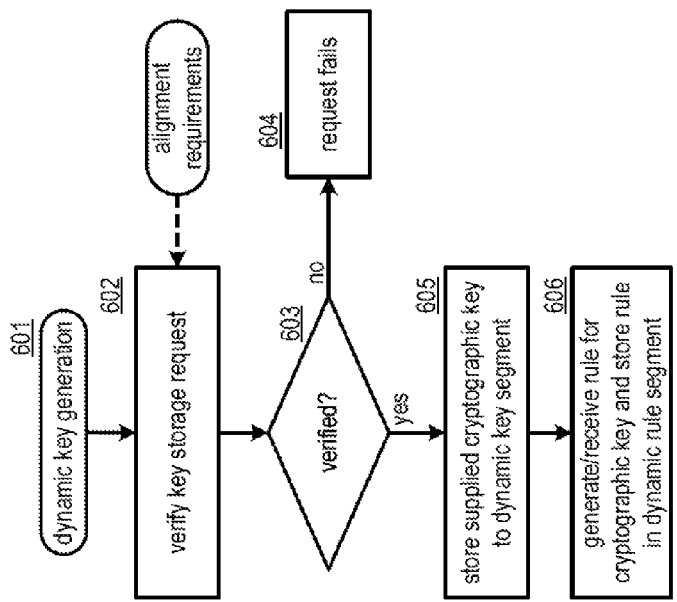
FIG. 23 is a logic diagram of an embodiment of a method for writing a cryptographic key and a corresponding dynamically-generated rule to dynamic segments of a key store memory and rule set memory in accordance with the present disclosure.

FIG. 23 is a logic diagram of an embodiment of a method for storage of a dynamically-generated rule in the rule set memory 562 that begins at step 601 with issuance of a write request to store a new cryptographic key or modify a previously-generated key at the key store memory 560. The component that issues the write request may be, for example, a software component, such as one of the cryptographic clients 56-58, as part of a hardware-implemented or software-implemented key ladder operation, or by a hardware key generation component. At step 602, the arbitration module 540 verifies whether the request to write the cryptographic key is valid. To illustrate, the arbitration module 540 may enforce one or more alignment requirements to ensure that unauthorized or unintended modification of an existing key in the key store memory 560 is avoided. Due to its dynamic nature, the key blocks of the DKS 528 may be overwritten for efficient key storage usage (as may the key blocks of the SKS 524). However, this may introduce certain vulnerabilities that allow an unauthorized entity to reduce the entropy length of the existing key by loading a shorter known key over a portion of the longer key (this being commonly known as key decimation). To avoid this vulnerability, the arbitration module 540 may employ an alignment requirement that ensures that for key types larger than the fixed block size, the index or address of the initial key block of the key being accessed (for either reading or writing) is an integer multiple of the standard size of the key being accessed in terms of block size. That is, the cryptographic key is associated with a cryptographic algorithm having a key size that is an integer multiple of the fixed-size of the fixed-size blocks, and the alignment requirement requires that the key store index represent an integer multiple of the key size.

To illustrate, assuming a key block is 64 bits, if a rule for a key in the key store memory 560 specifies a 128 bit key, a read or write request for any of the blocks associated with this key must be aligned to an even number (that is, the initial block addressed or indexed by the request must be an even number). As another example, assuming again a key block size of 64 bits, if a rule for a key in the key store memory 560 specifies a 256 bit key (that is 64 bits*4), a read or write request for any of the blocks associated with this key must be equal to 4*n, where n=0, 1, 2, Similarly, for a key associated with a 1024 bit key (that is, 64 bits*16), a read or write request to any blocks associated with this key must have an index or initial address equal to 16*n, where n=0, 1, 2, . . . .

With this alignment requirement enforced, a newly loaded key will not straddle two existing keys in the key store 560 and a newly loaded longer key can replace two or more shorter keys. Moreover, a short key can be loaded into one or more blocks of an existing longer key, but this will not permit decimation of the existing longer key as a different rule will also be generated for the replaced blocks. Thus the modified longer key will be useless to a hacker as different key blocks along the whole key length will have different algorithms or rules and the rule checking performed during the retrieval of the modified longer key will fail due to the different rules being present for the same key.

Returning to step 603, if the arbitration module 540 determines that the request is not valid, the method continues at step 604 where the request fails silently (e.g., no response is given, the request is ignored), false information is provided, or an error status is provided. If, however, the request is valid, the method continues at step 605 where the arbitration module 540 provides access to the necessary one or more blocks of the DKS 528 of the key store memory 560 and the component requesting the storage of the dynamically-generated key executes the cryptographic function to write the dynamically-generated key into the one or more blocks of the DKS 528.

Figure 24:
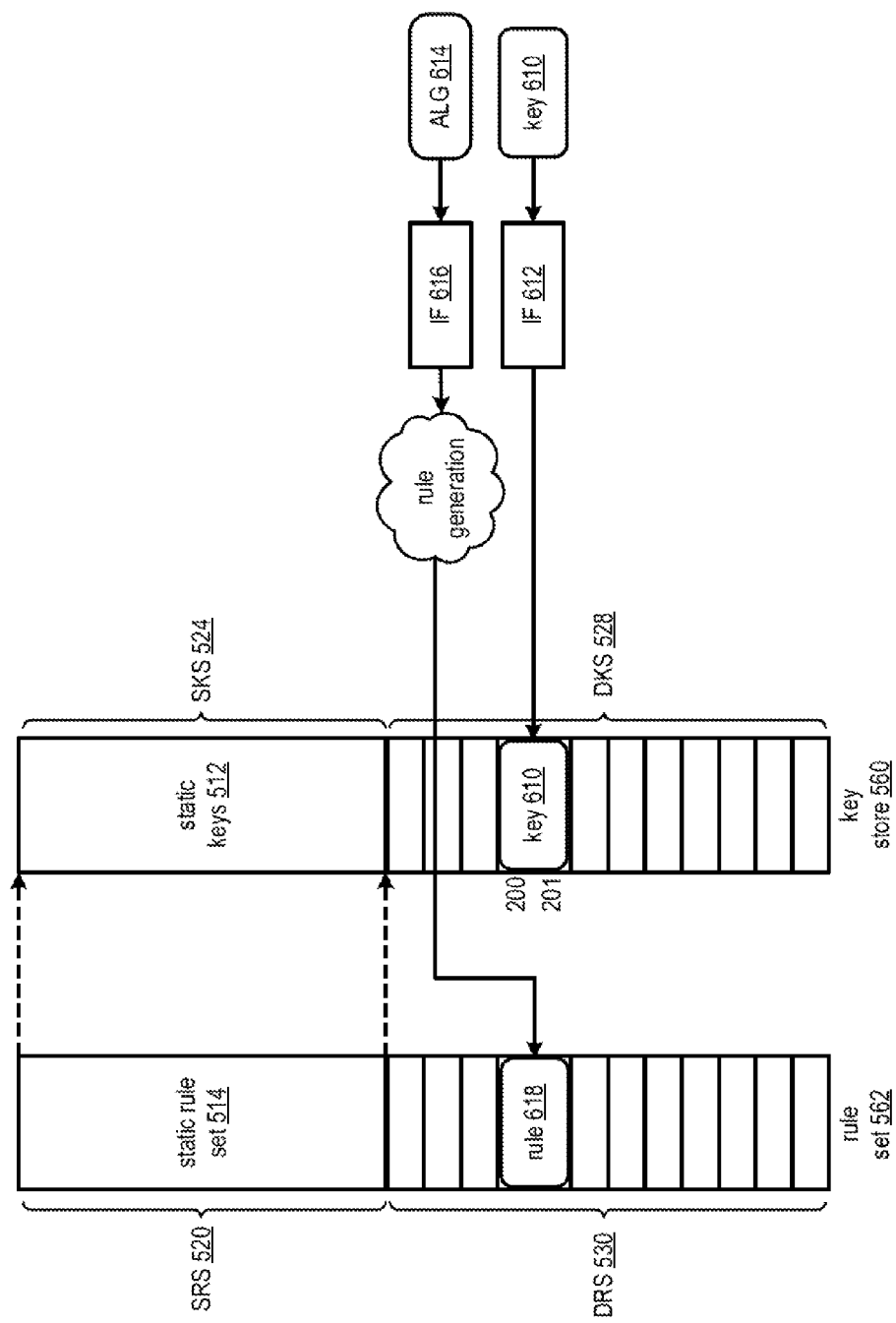
FIG. 24 is a diagram of an example write operation for storing a cryptographic key and corresponding dynamically-generated rule from a cryptographic client to dynamic segments of a key store memory and rule set memory in accordance with the present disclosure.
Figure 25:
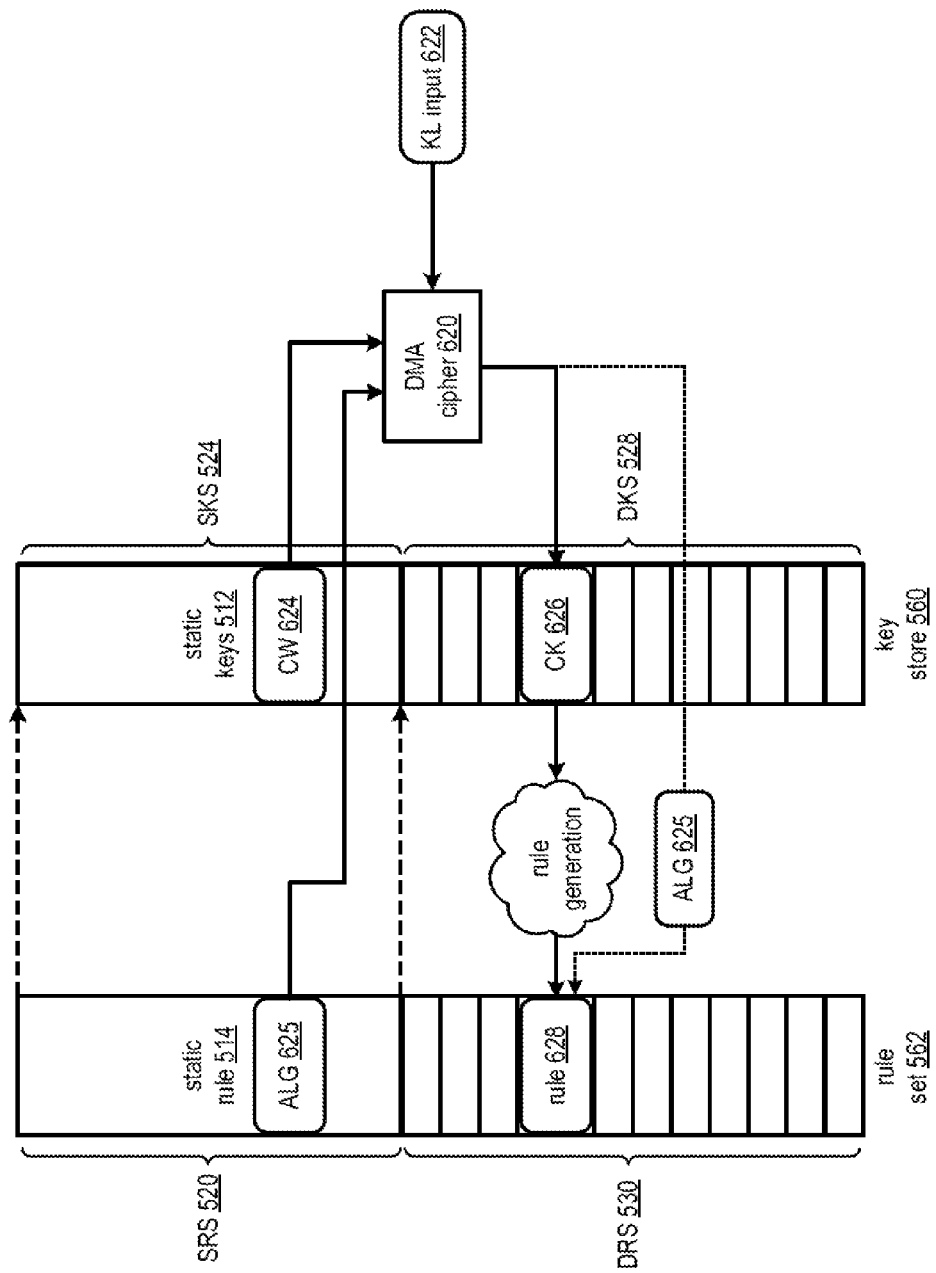
FIG. 25 is a diagram of an example of a write operation for storing a cryptographic key and corresponding dynamically-generated rule from a key ladder to dynamic segments of a key store memory and rule set memory in accordance with the present disclosure.
Figure 26:
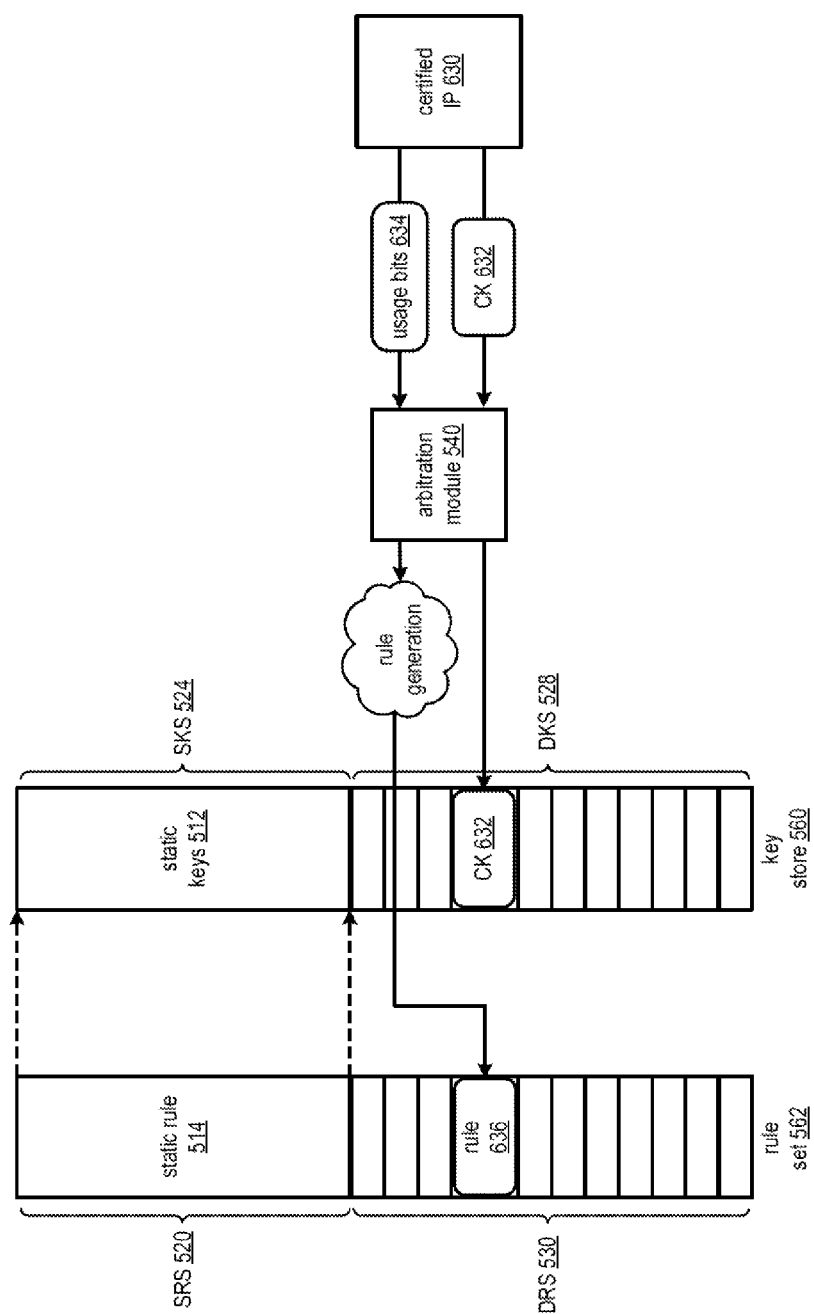
FIG. 26 is a diagram of an example of a write operation for storing a cryptographic key and corresponding dynamically-generated rule from a hardware key generator to dynamic segments of a key store memory and rule set memory in accordance with the present disclosure.

At the same time that the key is stored to the DKS 528, at step 606 the device stores the appropriate rule for the key in the corresponding set of one or more blocks of the DRS 530 of the rule set memory 562. In some embodiments, the rule is supplied by a component via an interface, such as the registers of the IO interfaces 24 and 26. In such instances, the supplied rule is received and then stored to the DRS 530. In other embodiments, usage information for the key is supplied by a component, and the hardware of the device then generates a rule based on this usage information, and the generated rule is then stored to the DRS 530. In further embodiments, the key is generated as part of a key ladder operation, and usage information for the key (e.g., the particular cryptographic algorithm to be used) may be based on a static rule from the OTP 510 involved in the key ladder operation FIGS. 24-26 are diagrams of examples of storing a dynamically-generated cryptographic key and corresponding rule to the DKS 528 of the key store memory 560 and the DRS 530 of the rule set memory 562, respectively, in accordance with the method of FIG. 23. In the example of FIG. 24, a software-initiated loading of a dynamic key is illustrated. When software (e.g., a cryptographic client) loads a content key into the DRS 530, the software also has to set the corresponding cryptographic algorithm for the key, the key value itself, and the starting key store index into the interface for the key store memory. Once the interface is loaded with this information, the software can trigger the loading operation, in which case the arbitration module 540 generates the appropriate rule based on indicated algorithm and stores the supplied key into the corresponding one or more blocks of the DKS 528 while loading the generated rule into the corresponding one or more blocks of the DRS 530 at the same time.

To illustrate, a cryptograph client using an AES cryptographic operation generates a 128 bit AES key 610 and stores the key 610 to a register interface 612. Concurrently, the cryptographic client stores an algorithm (ALG) indicator 614 representing the 128 bit AES algorithm to a register interface 616. Further, the cryptographic client specifies block 200 as the starting key store index for storing the key 610 into a register interface (not shown in this example), and then triggers the write operation. Upon verifying the write operation (including performing an alignment check), the arbitration module 540 accesses the ALG indicator 614 from the register interface 616 and generates a rule for the key 610 based on the algorithm indicated by the ALG indicator 614. In this example, the rule would have the following attributes (referring to Table 1 above): Write Algorithm=ANY; Read Algorithm=AES; Type=CW; Source=Destination=FB; E/D=ANY (the remaining rule fields are not relevant in this example). The arbitration module 540 stores the key 610 to blocks 200 and 201 (the blocks are 64 bits in this example) in the DKS 528, and concurrently stores the generated rule 618 to the blocks of the DRS 530 that correspond to blocks 200 and 201 of the DKS 528.

The example of FIG. 25 illustrates a loading of a dynamically-generated key as a key ladder element key that is part of a key ladder operation. In at least one embodiment, a key ladder element key is identified as such by the Destination field of the corresponding rule. The destination field is "KS SRS" or "KS DRS", the key is identified as a key ladder element key. In such instances, the adjacency field is redefined thusly: when the destination field has the value "KS SRS", the corresponding key is defined to be an up-layer key ladder element key, which means that it is not the key for generating content keys for storage in the DKS 528. In this case, the adjacency will be the actual allowable destination key store location offset from the element key block. Conversely, when the destination field has the value "KS DRS", the corresponding key is defined to be the last key ladder element key, which will be used to generate the content keys. In such instances the value of the adjacency field will be the read algorithm to be used by the generated content keys, as specified by the corresponding rule accessed from the static rule segment 520. As such, the arbitration module 540 will enforce that the output content keys can only be routed into the DKS 528 and no adjacency will be used.

During the last, or final, key ladder element operation for generating a content key, cipher hardware 620 will receive key ladder input 622 along with the last key ladder codeword 624 from the SKS 524 and an indication of the algorithm (ALG) used in the last key ladder element operation. The key ladder input 622 may comprise algorithm bits (ALG 625) obtained from the static rule used for the key ladder operation (as specified by the adjacency field), and which indicate the particular cryptographic algorithm for generated content key. The cipher hardware 620 uses the codeword 624 and the key ladder input 622 to generate a content key 626, which is supplied to the arbitration module 540, along with a key store block index and the algorithm bits (ALG 625), for storage at one or more blocks of the DKS 528. Concurrently, the arbitration module 540 generates a rule 628 for accessing the content key 626 based on the algorithm bits (ALG 625) provided by the cipher hardware 620 and the key ladder input 622 and stores the generated rule 628 at the corresponding block(s) of the DRS 530. In this case, the rule would have the following attributes (referring to Table 1 above): Write Algorithm=ANY; Read Algorithm=ALG (that is, ALG 625 from cipher hardware 620); Type=CW; Source=Destination=FB; E/D=ANY (the remaining rule fields are not relevant in this example).

The example of FIG. 26 illustrates a loading of a dynamically-generated key from a hardware cryptographic component, such as the identified certified IP component 630. In this example, the component 630 generates a content key 632 and provides the content key 632 to the arbitration module 540 via a corresponding interface (not shown), along with usage bits 634 that indicate the manner in which the content key 632 is to be used. In one embodiment, the usage bits 634 include data indicating the algorithm, whether the content key 632 is to be used for encryption, decryption, or both, and the length of the key (which may instead be indicated or inferred from the algorithm). In this case, after verifying the write access request (including alignment check), the arbitration module 540 stores the content key 632 at the DKS 528 starting at a specified key block index. Concurrently, the arbitration module 540 uses the usage bits 634 to generate a rule 636 for accessing the content key 632 and stores the generated rule 636 to the corresponding blocks of the DRS 530. Typically, the arbitration module 540 generates the rule 636 through translation of the usage bits 634 into the corresponding fields of the rule 636 (e.g., as shown in Table 1 above).

While the segmentation of the key store memory 560 and the rule set memory 562 into static and dynamic segments permits adaptation to dynamic rule generation and key generation/modification without requiring excessive OTP storage provisioning, the ability to dynamically store and modify keys and rules in non-volatile memory introduces potential vulnerabilities. To illustrate, attackers may attempt to directly retrieve the privileged information along the path where it is used or transferred, or attempt to change the corresponding rules to allow otherwise prohibited usage so that the security of the key store can be compromised. FIGS. 27-32 describe various mechanisms for the segmented key store and rule set to ensure the secrecy of the privileged information and the integrity of the rules protecting access to the privileged information.

FIG. 27 is a logic diagram of an embodiment of a method for protecting the keys 512 and corresponding rule set 514 during transfer from the OTP memory 510 to the key store memory 560 and rule set memory 562 in accordance with the present disclosure. At an initial step 701, when the OTP memory 510 is being provisioned during initial provisioning of the device 10, the keys 512 are obfuscated and the obfuscated versions of the keys 512 are stored to the OTP memory 510. Likewise, the rule set 514 may be obfuscated and the obfuscated versions of the rules of the rule set 514 may be stored to the OTP memory 510 during provisioning. Any of a variety of obfuscation algorithms may be used during this obfuscation process. To illustrate the obfuscation operation represented by EQ. 1 above may be utilized to obfuscate the secrets to be stored to the OTP memory 510.

Subsequently, at step 702 the device 10 initiates a boot process from reset or power-on. In response, at step 703 the integrity module 542 seeds an obfuscation function with a value that is specific to that particular iteration of the boot process. To illustrate, the integrity module 542 may use a randomly generated or pseudo-randomly generated value as a seed value for the obfuscation function. At step 704, the loader module 544 accesses the keys 512 and rule set 514 so as to transfer copies to the SKS 524 and SRS 520, respectively, implemented in non-volatile memory of the device 10. However, prior to storing the copies, at step 704 the integrity module 542 de-obfuscates the obfuscated versions of these values stored in the OTP memory 510 using a reverse-obfuscation algorithm that corresponds to the obfuscation algorithm used at step 701 (e.g., the reverse-obfuscation process represented by EQ. 2 above). At step 705, the integrity module 542 re-obfuscates the keys 512 using the obfuscation function seeded at block 703 to generate obfuscated versions of the keys 512 for loading into the SKS 524. Similarly, the rule set 514 can be re-obfuscated using the seeded obfuscation function and the resulting obfuscated version of the rule set 514 can be stored to the SRS 520.

The process described protects the secrets represented by the keys 512 and the rule set 514 by de-obfuscating and re-obfuscating the keys 512 and rule set 514 in a manner particular to each power cycle. In this manner, the scrambled data stored in the SKS 524 and the SRS 520 differs for each time the device 10 is reset, which in turn reduces the likelihood that an attacker can successfully break the obfuscation process and gain access to the unscrambled version of the keys 512 or the rule set 514.

FIG. 28 is a logic diagram of an embodiment of a method for protecting dynamically-generated keys and corresponding rules during storage in the dynamic segments of the key store and rule set memories. At an initial step 701, a write access request is received from a cryptographic client or other component and the write request is validated by the arbitration module 540. In response, the verification module 542 obfuscates the key using the obfuscation function seeded at step 703 of the method of FIG. 27 and stores the obfuscated version of the key in the DKS 528. This same process may be used to obfuscate the corresponding rule before it is stored in the DRS 530. As such, if an attacker were to gain unauthorized access to the key store memory 560 or the rule set memory 562, the attacked would be further thwarted by the secrecy maintained for the information stored therein due to the obfuscation process.

FIG. 29 is a logic diagram of an embodiment of a method for read access of obfuscated keys and corresponding rules from the key store and rule set memories in accordance with the present disclosure. The method begins at step 721 with the receipt of read request for a key from the key store memory 560. After validating the requestor, at step 722 the integrity module 542 de-obfuscates the obfuscated rule for the requested key and the arbitration module 540 validates the request based on the de-obfuscated rule. After validating the request, at step 723 the arbitration module 540 accesses the obfuscated key, the integrity module 542 de-obfuscates the obfuscated key, and the de-obfuscated key is provided to the requestor.

Figure 31:
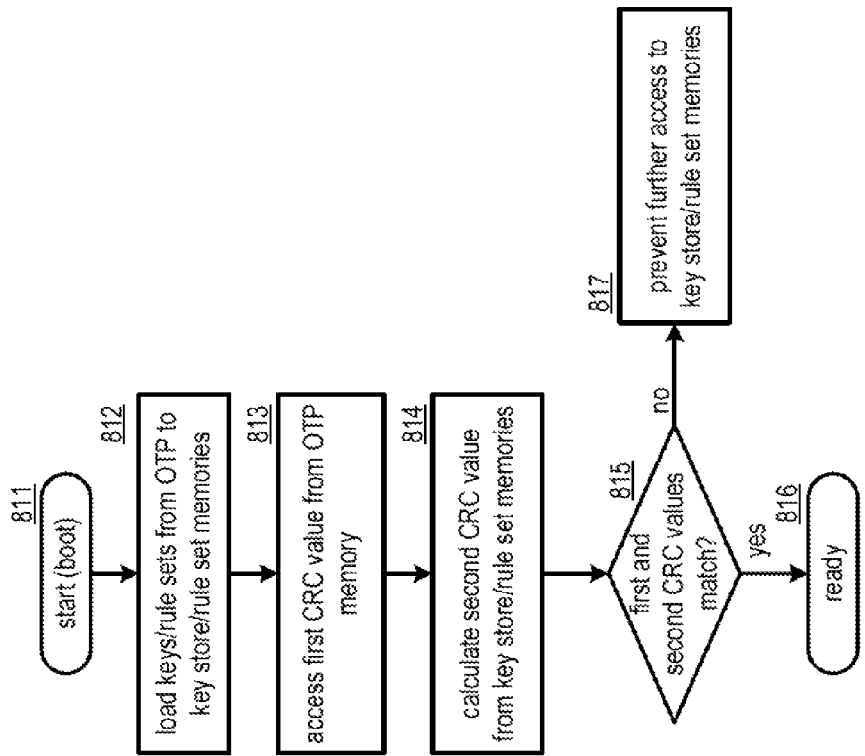
FIG. 31 is a logic diagram of an embodiment of a method for verifying an integrity of a key store memory and a rule set memory during a boot process using calculated CRC values in accordance with the present disclosure.
Figure 30:
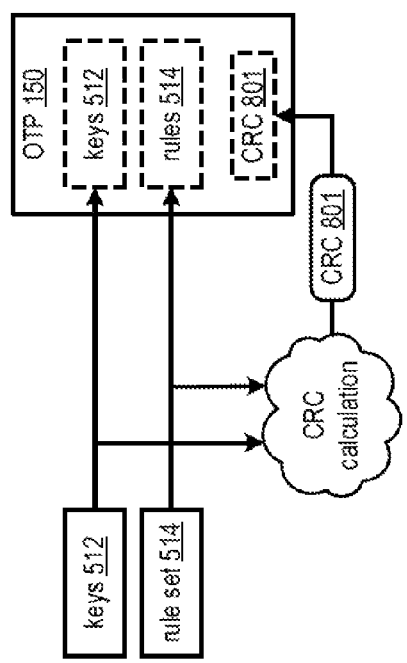
FIG. 30 is a diagram of an example of a cyclical redundancy check (CRC) calculation operation during provisioning of an OTP memory storing cryptographic keys and corresponding rules in accordance with the present disclosure.
Figure 32:
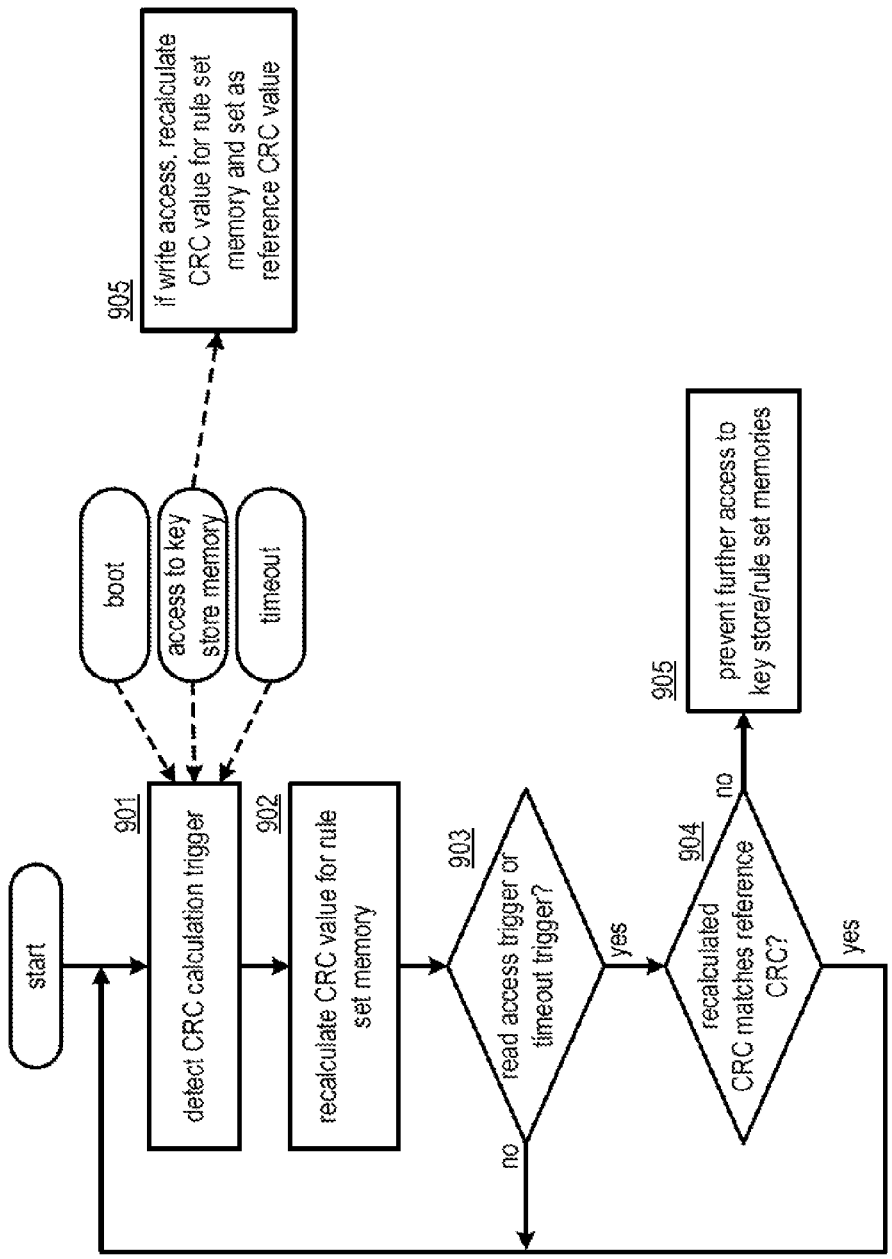
FIG. 32 is a logic diagram of an embodiment of a method for verifying an integrity of a key store memory and a rule set memory using calculated CRC values in accordance with the present disclosure.

As described above, an attacker may attempt to derive a key either through decimation (whereby the entropy of a key is reduced by overwriting a portion of the key with a known value) or through unauthorized modification of the rule so as to give the attacker "authorized" access to the entire key. FIGS. 30-32 illustrate example mechanisms for detecting such modifications through the use of cyclical redundancy check (CRC) values.

FIG. 30 is a diagram of an embodiment of a method for initial calculation of reference CRC value for the secrets stored in an OTP memory during its provisioning in accordance with the present disclosure. As described above, when the device 10 is provisioned, a static set of keys 512 and a corresponding static rule set 514 are stored in the OTP memory 150. To configure an initial representation of the set of keys 512 and rule set 514 in the OTP memory 150, a CRC value 801 covering one or both of the set of keys 512 and the rule set 514 is calculated and stored at a designated location of the OTP memory 150. In some embodiments, one reference CRC value may be generated from the keys 512 and a separate reference CRC value may be generated from the rule set 514. In the event that the obfuscation techniques described above are used, the CRC value may be calculated using the obfuscated versions of the keys and/or rules. The one or more CRC values 801 generated and stored in this manner thus serve as an initial reference CRC value that may be used to identify any modifications to the values represented by the reference CRC during transfer to the key store/rule set memories.

FIG. 31 is a logic diagram of an embodiment of a method for verifying the integrity of the static segments of the key store/rule set memories after initial loading from the OTP memory 150. The method starts at step 811 with the initiation of a boot process for the device 10. As part of the boot process, at step 812 the loader module 544 transfers copies of the keys 512 and rule set 514 from the OTP memory 150 to the SKS 524 and the SRS 520, respectively, as described above.

After these values have been transferred, at step 813 the integrity module 542 accesses the CRC value 801 from the OTP memory, and at step 814 the integrity module 542 calculates a second CRC value based on one or both of the keys 512 and the rule set 514 (depending on which values were used to calculate the CRC value 801 in the method of FIG. 30). If there has been no modification or corruption of the values during the copying from the OTP memory to the key store/rule set memories, the CRC value 801 and the second CRC value should be exact matches. Accordingly, at step 815 the integrity module 542 compares the CRC value 801 with the CRC value calculated at step 814. If there is a match, the integrity of the secrets of the OTP memory 150 have been maintained during the boot process, and thus the device 10 is ready to enter an operational mode with the key store memory 560 at step 816.

Otherwise, if the comparison at step 815 reveals a mismatch, then one or both of the keys 512 or the rule set 514 has been corrupted or compromised. In such instances, at step 817 the arbitration module 540 presents further access to the key store memory 560 and the rule set memory 562, such as by wiping out at least the key store memory 560 (e.g., by overwriting the entire key store memory 560 with all 1's or all 0's), setting a configuration parameter that prevents addressing of any block of the key store memory 560 under any condition, and the like. In this manner, if an attacker is able to corrupt the transfer process so as to reconfigure a static rule or decimate a static key, this corruption is detected through the CRC value mismatch and any further use of the corrupted secret or corrupted rule is prevented.

FIG. 32 is a logic diagram of an embodiment of a method for verifying the integrity of one or both of the static segments and dynamic segments of the key store/rule set memories during an operational mode of the device 10 in accordance with the present disclosure. After the initial loading of static keys and rules into the static segments of the key store memory 560 and rule set memory 562, components are enabled to dynamically generate keys and have these keys and corresponding access rules stored to the dynamic segments of the key store memory 560 and rule set memory 562, respectively. As such, this prevents another opportunity for an attacker to attempt to corrupt a rule or decimate a key. The method of FIG. 32 provides a mechanism to provide periodic verification of the integrity of the rule set and the keys through CRC comparisons. The method initiates at step 901 with the detection of a CRC calculation trigger by the integrity module 542 during operation of the device 10 after the boot process. The CRC trigger may be the completion of the boot process (this process being reflected in the method of FIG. 31), a read or write access to the key store memory 560, or the timeout or lapse of a configurable idle timer set to trigger periodic integrity validation. In response to detecting a CRC calculation trigger, at step 902 the integrity module 542 recalculates a CRC value for at least the rule set memory 562. In some embodiments, the key store memory 560 may be included in this CRC calculation, or a separate CRC value for the key store memory 560 may be recalculated.

At step 903, the integrity module 542 determines whether the CRC calculation trigger detected at step 901 is a read access trigger or timeout trigger. If not, the method returns to step 901 to await the next detected CRC calculation. However, if the CRC calculation trigger is a read access trigger or timeout trigger, at step 904, the CRC value calculated at step 902 is compared with the CRC value calculated at a previous iteration of the method of FIG. 32. That is, the CRC value calculated at step 902 serves as the reference CRC value for the next iteration of the method of FIG. 32. Note that, as represented by step 904, if the CRC calculation trigger was a write access, a CRC value is calculated for the rule set memory after the write has completed, and this CRC value then serves as the reference CRC for the next iteration of the method. The CRC value calculated in response to a read access trigger or timeout trigger should match the reference CRC. If there is a match, the method returns to step 901 to await the next detected CRC calculation trigger for another iteration of the method. If there is a mismatch, then one or both of the key store memory 560 or the rule set memory 562 have been compromised or corrupted, and thus at step 905 the arbitration module 540 prevents further access to the key store memory 560 and the rule set memory 562, such as by overwriting them with all 1's, all 0's, or random data, or by applying a configuration that prevents addressing any of the blocks of the memories 560 and 562.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope of the claimed invention.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any tangible, non-transitory storage medium, or combination of tangible, non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), or removably attached to the computing system (e.g., an optical disc or Universal Serial Bus (USB)-based Flash memory).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a media processing device, a method comprising:
   determining a first cyclical redundancy check (CRC) value from a plurality of rules stored in a rule set memory of the media processing device, each rule of the plurality of rules corresponding to a corresponding cryptographic key stored at the media processing device;
   comparing the first CRC value with a second CRC value corresponding to the plurality of rules; and
   preventing further access to the plurality of rules in the rule set memory in response to determining a mismatch between the first CRC value and the second CRC value.

2. The method of claim 1, further comprising:
   copying the plurality of rules from a one time programmable (OTP) memory to the rule set memory; and
   accessing the second CRC value from the OTP memory.

3. The method of claim 2, further comprising:
   programming the OTP memory with the first CRC value during a provisioning of the media processing device.

4. The method of claim 1, further comprising:
   determining the second CRC value based on the plurality of rules stored in the rule set memory during a boot process of the media processing device; and
   wherein determining the first CRC value comprises determining the first CRC value after the boot process has finished.

5. The method of claim 1, further comprising:
   determining the second CRC value based on the plurality of rules stored in the rule set memory in response to an access to the rule set memory.

6. The method of claim 1, wherein comparing the first CRC value with the second CRC value comprises comparing the first CRC value with the second CRC value in response to a lapse of a timer or a read access request to the rule set memory.

7. The method of claim 1, wherein preventing further access to the plurality of rules in the rule set memory comprises wiping the plurality of rules from the rule set memory.

8. A media processing device comprising:
   a key store memory to store a plurality of cryptographic keys;
   a rule set memory to store a plurality of rules for the plurality of cryptographic keys; and
   an integrity module coupled to the key store memory and the rule set memory, the integrity module to determine a first cyclical redundancy check (CRC) value from the plurality of rules stored in the rule set memory and compare the first CRC value with a second CRC value corresponding to the plurality of rules; and
   an arbitration module coupled to the integrity module, the arbitration module to prevent further access to the plurality of rules in the rule set memory responsive to the integrity verification module signaling a mismatch between the first CRC and the second CRC.

9. The media processing device of claim 8, further comprising:
   a loader module to copy the plurality of rules from a one time programmable (OTP) memory to the rule set memory; and
   the integrity module is to access the second CRC value from the OTP memory.

10. The media processing device of claim 8, wherein the OTP memory is programmed with the first CRC value during a provisioning of the media processing device.

11. The media processing device of claim 8, wherein:
    the integrity module is to determine the second CRC value based on the plurality of rules stored in the rule set memory during a boot process of the media processing device; and
    the integrity module is to determine the first CRC value after the boot process has finished.

12. The media processing device of claim 8, wherein:
    the integrity module is to determine the second CRC value based on the plurality of rules stored in the key store memory in response to an access to the rule set memory.

13. The media processing device of claim 8, wherein:
    the integrity module is to compare the first CRC value with a second CRC value in response to a lapse of a timer or a read access request for the rule set memory.

14. The media processing device of claim 8, wherein:
    the arbitration module is to prevent further access to the plurality of rules in the rule set memory by wiping the plurality of rules from the rule set memory.

15. The media processing device of claim 8, wherein:
    the key store memory and the rule set memory comprise at least one random access memory.

16. The media processing device of claim 15, wherein:
    the at least one random access memory comprises a static random access memory (SRAM).

* * * * *